US012142277B2

(12) United States Patent
Fink et al.

(10) Patent No.: US 12,142,277 B2
(45) Date of Patent: Nov. 12, 2024

(54) GENERATING A COMPOSITE RESPONSE TO NATURAL LANGUAGE INPUT USING A TRAINED GENERATIVE MODEL AND BASED ON RESPONSIVE CONTENT FROM DISPARATE CONTENT AGENTS

(71) Applicant: GOOGLE LLC, Mountain View, CA (US)

(72) Inventors: Michael Fink, Tel Aviv (IL); Vladimir Vuskovic, Zollikerberg (CH); Shimon Or Salant, Rehovot Center District (IL); Deborah Cohen, Tel Aviv (IL); Asaf Revach, Nordia Center District (IL); David Kogan, Natick, MA (US); Andrew Callahan, Somerville, MA (US); Richard Borovoy, Boston, MA (US); Andrew Richardson, Cambridge, MA (US); Eran Ofek, Rehovot (IL); Idan Szpektor, Kfar Saba (IL); Jonathan Berant, Tel Aviv (IL); Yossi Matias, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/406,752

(22) Filed: Jan. 8, 2024

(65) Prior Publication Data
US 2024/0161743 A1    May 16, 2024

Related U.S. Application Data

(63) Continuation of application No. 17/587,478, filed on Jan. 28, 2022, now Pat. No. 11,869,506, which is a
(Continued)

(51) Int. Cl.
*G06F 40/30* (2020.01)
*G06F 16/248* (2019.01)
(Continued)

(52) U.S. Cl.
CPC ............ *G10L 15/22* (2013.01); *G06F 40/284* (2020.01); *G06N 3/08* (2013.01); *G10L 15/063* (2013.01);
(Continued)

(58) Field of Classification Search
CPC ............ G06F 16/244; G06F 16/24532; G06F 16/24556; G06F 16/2471; G06F 16/345;
(Continued)

(56) References Cited

U.S. PATENT DOCUMENTS 6,275,820 B1 *  8/2001  Navin-Chandra .... G06F 16/951
6,304,864 B1 * 10/2001  Liddy ................. G06F 16/9535
                                                          706/15
(Continued)

FOREIGN PATENT DOCUMENTS

WO    2016205147    12/2016
WO    2019236372    12/2019

OTHER PUBLICATIONS

European Patent Office; Summons to attend oral proceedings issued in Application No. 19736534.9, 11 pages, dated Oct. 6, 2023.
(Continued)

*Primary Examiner* — Martin Lerner
(74) *Attorney, Agent, or Firm* — Gray Ice Higdon

(57) ABSTRACT

Generating expanded responses that guide continuance of a human-to computer dialog that is facilitated by a client device and that is between at least one user and an automated assistant. The expanded responses are generated by the automated assistant in response to user interface input provided by the user via the client device, and are caused to
(Continued)

be rendered to the user via the client device, as a response, by the automated assistant, to the user interface input of the user. An expanded response is generated based on at least one entity of interest determined based on the user interface input, and is generated to incorporate content related to one or more additional entities that are related to the entity of interest, but that are not explicitly referenced by the user interface input.

19 Claims, 13 Drawing Sheets

Related U.S. Application Data continuation of application No. 16/621,376, filed as application No. PCT/US2019/034625 on May 30, 2019, now Pat. No. 11,238,864.

(60) Provisional application No. 62/679,919, filed on Jun. 3, 2018.

(51) Int. Cl.
  | | |
  |---|---|
  | *G06F 40/284* | (2020.01) |
  | *G06N 3/0475* | (2023.01) |
  | *G06N 3/08* | (2023.01) |
  | *G10L 15/06* | (2013.01) |
  | *G10L 15/18* | (2013.01) |
  | *G10L 15/20* | (2006.01) |
  | *G10L 15/22* | (2006.01) |

(52) U.S. Cl.
  CPC .......... *G10L 15/1815* (2013.01); *G10L 15/20* (2013.01); *G10L 2015/223* (2013.01)

(58) Field of Classification Search
  CPC ...... G06F 40/279; G06F 40/284; G06F 40/30; G06F 16/248; G10L 2015/221; G06N 3/0475
  USPC ........... 704/1, 9, 275; 706/12; 707/664, 709, 707/728, 748, 770
  See application file for complete search history.

(56) References Cited

U.S. PATENT DOCUMENTS

| | | | |
|---|---|---|---|
| 8,479,091 B2 | 7/2013 | Buck et al. | |
| 9,865,260 B1 | 1/2018 | Vuskovic et al. | |
| 10,459,928 B2 * | 10/2019 | Chang | G06F 16/3346 |
| 10,546,066 B2 | 1/2020 | Li et al. | |
| 10,654,380 B2 * | 5/2020 | Chang | B60N 2/2806 |
| 10,776,579 B2 * | 9/2020 | Mishra | G06F 40/30 |
| 10,909,157 B2 * | 2/2021 | Paulus | G06F 40/30 |
| 11,238,864 B2 | 2/2022 | Fink et al. | |
| 11,869,506 B2 * | 1/2024 | Fink | G06F 40/284 |
| 2002/0049692 A1 | 4/2002 | Venkatram | |
| 2002/0129145 A1 * | 9/2002 | Chow | G06F 16/2471 709/225 |
| 2003/0233401 A1 * | 12/2003 | Dean | G06F 16/2471 709/202 |
| 2008/0109425 A1 * | 5/2008 | Yih | G06F 16/345 706/12 |
| 2008/0256036 A1 * | 10/2008 | Falk | G06F 16/951 |
| 2016/0035230 A1 | 2/2016 | Spaulding | |
| 2016/0055246 A1 | 2/2016 | Marcin et al. | |
| 2016/0092160 A1 | 3/2016 | Graff et al. | |
| 2016/0163311 A1 | 6/2016 | Crook et al. | |
| 2016/0352656 A1 | 12/2016 | Galley et al. | |
| 2016/0364382 A1 | 12/2016 | Sarkaya | |
| 2017/0099200 A1 | 4/2017 | Ellenbogen et al. | |
| 2017/0160813 A1 | 6/2017 | Divakaran et al. | |
| 2017/0162197 A1 | 6/2017 | Cohen | |
| 2017/0213130 A1 * | 7/2017 | Khatri | G06N 3/044 |
| 2017/0300831 A1 | 10/2017 | Gelfenbeyn et al. | |
| 2018/0061400 A1 | 3/2018 | Carbune et al. | |
| 2018/0144743 A1 | 5/2018 | Aggarwal et al. | |
| 2018/0196796 A1 | 7/2018 | Wu | |
| 2018/0260387 A1 | 9/2018 | Ben-Kiki | |
| 2019/0103127 A1 | 4/2019 | Tseretopoulos | |
| 2019/0147760 A1 | 5/2019 | Bruckner | |
| 2019/0187787 A1 | 6/2019 | White et al. | |
| 2019/0198016 A1 | 6/2019 | Mckenzie | |
| 2019/0251165 A1 * | 8/2019 | Bachrach | G06F 40/30 |
| 2019/0325084 A1 | 10/2019 | Peng et al. | |
| 2019/0340238 A1 | 11/2019 | Doggett | |
| 2019/0354594 A1 * | 11/2019 | Foster | G06F 40/30 |
| 2020/0012892 A1 * | 1/2020 | Goodsitt | G06F 40/20 |
| 2020/0244807 A1 | 7/2020 | Apshankar et al. | |
| 2022/0157308 A1 | 5/2022 | Fink et al. | |

OTHER PUBLICATIONS

European Patent Office; Communication pursuant to Article 94(3) issued in Application No. 19736534.9, 7 pages, dated Jul. 25, 2022.

Anonymous: "Recurrent Neural Network"; Wikipedia; retrieved from internet: URL:https://en.wikipedia.org/w/index.php?title=Recurrent_neural_network&oldid=835281737; 18 pages; Apr. 7, 2018.

European Patent Office; International Search Report and Written Opinion of Ser. No. PCT/US2019/034625; 24 pages; dated Aug. 19, 2019.

European Patent Office; Result of Consultation issued in Application No. 19736534.9, 10 pages, dated Mar. 27, 2024.

China National Intellectual Property Administration; Notification of First Office Action issued in Application No. 201980044257.8; 11 pages; dated Jul. 30, 2024.

* cited by examiner

GENERATING A COMPOSITE RESPONSE TO NATURAL LANGUAGE INPUT USING A TRAINED GENERATIVE MODEL AND BASED ON RESPONSIVE CONTENT FROM DISPARATE CONTENT AGENTS

This application is a continuation of U.S. Patent Application Ser. No. 17/587,478 filed on 28 Jan. 2022, now U.S. Pat. No. 11,869,506 issued on 9 Jan. 2024, which is a continuation of U.S. patent application Ser. No. 16/621,376 filed on 11 Dec. 2019, now U.S. Pat. No. 11,238,864 issued on 1 Feb. 2022, which is a 371 of PCT/US/2019/034625 filed on 30 May 2019, which claims benefit of U.S. Patent Application Ser. No. 62/679,919 filed on 3 Jun. 2018.

BACKGROUND

Humans may engage in human-to-computer dialogs with interactive software applications referred to herein as "automated assistants" (also referred to as "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input. An automated assistant responds to a request by, for example, controlling a peripheral device referenced in the request, providing responsive user interface output (e.g., audible and/or graphical) that is responsive to the request, etc.

Automated assistants are configured to respond to various types of recognized requests. Automated assistants typically respond to a recognized request with only content that is directly responsive to the recognized request. Moreover, there are many requests or other natural language inputs for which an automated assistant my respond with only a canned or default response. For example, if an automated assistant cannot determine a response for given natural language input, it may respond with a canned error message such as "sorry, I don't know how to help with that". Also, for example, for natural language input of "what do you think about X", an automated assistant can respond with a benign canned response that has been hand-crafted and is specific to "X". With such a human-to-computer interface, a user may have to provide elongated and/or multiple user interface inputs in order for the automated assistant to perform a desired technical task.

SUMMARY

Example aspects of the present disclosure may enable users to more efficiently control an automated assistant to perform a technical task (e.g., configure smart devices, set-up a network, or configure a router to use wireless encryption etc.), even when the user is initially unsure of the form of input required to command the assistant to perform the technical task. As such, the amount of user-device interaction required for the task to be performed (and the associated use of computational resources—e.g. bandwidth, processing etc.) may be reduced. Implementations are described herein for generating expanded responses that guide continuance of a human-to computer dialog that is facilitated by a client device and that is between at least one user and an automated assistant. The expanded responses are generated by the automated assistant in response to user interface input provided by the user via the client device, such as free-form natural language input (e.g., typed input or voice input that can be converted to text) or other input (e.g., tap or other selection of a "suggestion chip" for an expanded response). The expanded responses are caused to be rendered to the user via the client device, as a response, by the automated assistant, to the user interface input of the user. The response may include a prompt, which may be provided as a "suggestion chip" or other selectable element that forms part of the response. The selectable element may define a user input. Selection of the element by the user may cause a technical task to be performed by the automated assistant or associated device.

As described in more detail herein, an expanded response is generated based on at least one entity of interest determined based on the user interface input, and is generated to incorporate content related to one or more additional entities that are related to the entity of interest, but that are not explicitly referenced by the user interface input. Implementations seek to incorporate content, in an expanded response, that is determined to be likely to result in further engagement of the user in the dialog and/or that is determined to be likely to expand upon the user interface input, while still being relevant to the user interface input. Implementations can enable rich expanded responses to be provided in response to concise natural language user interface inputs, relieving the user from providing elongated and/or multiple user interface inputs, and conserving resources that would otherwise be consumed in receiving, processing, and responding to such elongated and/or multiple user interface inputs (e.g. bandwidth, processing power). As will be appreciated, implementations may conserve electrical power from, for example, an on-device battery which may otherwise have been needed to power on-device speaker(s) and/or microphone(s) and/or display(s) to allow the assistant to prompt or otherwise converse with the user.

Some implementations described herein generate, in response to user interface input, expanded responses that are composite responses. Composite responses are "composite" in that they are generated from multiple items of responsive content that can be received from a plurality of disparate content agents. For example, the multiple items of responsive content used to generate a composite response can include multiple textual snippets from a plurality of disparate content agents. As another example, the multiple items of responsive content used to generate a composite response can include a first textual snippet from a first content agent, a second textual snippet from a second content agent, an image from a third content agent, and a video from a fourth content agent. In some of those implementations, corresponding requests are transmitted to each of a plurality of disparate content agents, where the corresponding requests each identify the entity/entities of interest determined based on the user interface input. In response, each of the disparate content agents provides zero, one, or multiple items of content (e.g., textual snippets, videos, images, audio segments) that are responsive to the corresponding request it received. Further, a group of the received items of content is determined for use in generating a composite response, such as a subgroup that includes less than all of the returned items of content. In various implementations, a trained machine learning model is utilized to determine items of content to include in the subgroup. Additional description of example trained machine learning models that can be utilized is provided herein, along with additional description on use and training of such models. Yet further, the subgroup of items of content can be combined into a composite response.

For example, multiple textual snippets of the subgroup can be combined using, for example, a trained generative model such as a sequence-to-sequence model. The composite response can then be caused to be rendered in the human-to-computer dialog, as a response from the automated assistant that is responsive to the user interface input.

A composite response, generated according to techniques described herein, can incorporate information relevant to various attributes of an entity of interest, and can be generated in response to brief user interface inputs that reference the entity of interest, without explicitly referencing the attributes (e.g., brief inputs such as "what do you think about configuring [entity of interest]", "tell me about installing [entity of interest]", "[entity of interest]", etc.). Absent techniques described herein, multiple user interface inputs and/or more elongated user interface inputs would be required to obtain the information, resulting in increased processing, power-usage, and bandwidth-usage. Accordingly, a reduction in duration and/or a quantity of user inputs may be achieved, thereby increasing the efficiency of a given dialog session and reducing the load on resources required to interpret elongated and/or multiple user requests. For example, since a user may be relieved of affirmatively soliciting information automatically incorporated in composite responses described herein, this may conserve computing resources that otherwise would be used to process further natural language input of the user. Moreover, the trained machine learning model utilized to determine the textual snippets (and/or other content items) to include in the subgroup can be trained and/or utilized so that relevant textual snippets (and/or other content items) are included, while irrelevant and/or duplicate textual snippets (and/or other content items) are excluded—and can be trained and/or utilized taking into account context of current and prior dialogs, further ensuring relevancy of determined textual snippets (and/or other content items). Further, composite responses generated according to implementations described herein can guide continuance of the dialog in a manner that promotes resource efficient performance of technical tasks, such as configuring smart devices, establishing a wireless connection, or interacting with online services. The composite responses can include content that would otherwise be difficult to discover or access, improving the effectiveness of the interaction with the user.

As one non-limiting example of generating a composite response, assume a user is configuring a newly purchased router and is attempting to configure the router using WEP or WPA encryption. Further assume the user provides natural language user interface input of "Assistant, what do you think about WEP and WPA".

Typical automated assistants may be unable to generate a response to such input, or may only generate a canned error message such as "sorry, I don't know how to help with that". However, according to implementations disclosed herein, corresponding agent requests can be transmitted to each of a plurality of disparate content agents, where each of the requests is generated based on the entities of interest that correspond to "WEP" encryption technology and "WPA" encryption technology. In response to a corresponding request, each content agent can respond with one or more textual snippets that are responsive to the corresponding request.

For example, a request that includes the terms "WEP" and "WPA" can be transmitted to a first content agent that returns responsive news titles and, in response, the first content agent can provide a single textual snippet, from a news title, of "WPA is more secure than WEP". Also, for example, a request that includes the terms "WEP" and "WPA" can be transmitted to a second content agent that returns responsive content from a first online forum and, in response, the second content agent can provide two textual snippets, from two different threads, of: "WPA2 is the most secure encryption standard, and should be used if your router and wireless card support it"; and "Using WEP is like putting a 'stay away' sign in your yard and never locking your door". Also, for example, a request that includes the terms "WEP" and "WPA" can be transmitted to a third content agent that returns responsive snippets from a second online forum and, in response, the third content agent can provide one textual snippet, from a thread, of "WEP and WPA are encryption protocols to secure your wireless connection, and WPA2 is a new version of WPA" and can provide an image, from a thread, that includes a label on a router that indicates the router supports both WEP and WPA.

Continuing with the example, four candidate textual snippets and an image are returned from three disparate content agents. The four candidate textual snippets and the image can be processed using the trained machine learning model to determine a subgroup that includes less than all of the returned content items, such as an ordered subgroup that includes the textual snippets "WEP and WPA are encryption protocols to secure your wireless connection, and WPA2 is a new version of WPA", followed by "WPA2 is the most secure encryption standard, and should be used if your router and wireless card support it"—and that excludes the other two textual snippets and the image. Further, the ordered subgroup of two textual snippets can be combined into a composite response using, for example, a trained generative model. For example, a composite response of "WEP and WPA are encryption protocols to secure your wireless connection. WPA2 is a new version of WPA, is the most secure encryption standard, and should be used if your router and wireless card support it" can be generated. The composite response can then be caused to be rendered in the human-to-computer dialog, as a response from the automated assistant that is responsive to the user interface input of "Assistant, what do you think about WEP and WPA".

Continuing with the working example, in some implementations of determining the subgroup that includes two textual snippets, an embedding can be generated for each of the content items. For example, a first embedding can be generated for "WPA is more secure than WEP" based on processing tokens of the textual snippet over a recurrent neural network (RNN) model, such as a bidirectional long-short-term memory (LSTM) model trained to generate semantically rich phrase embeddings. Second, third, and fourth embeddings can be similarly generated for the corresponding remaining textual snippets. A fifth embedding can also be generated for the image. The fifth embedding can be generated based on processing pixels of the image over a convolutional neural network (CNN) model and/or other model. Alternatively, the fifth embedding can be generated based on processing text, that corresponds to the image, over the RNN model trained to generate semantically rich phrase embeddings. The text can be provided by the third content agent in combination with the image and can include, for example, a caption for the image and/or textual metadata (e.g., "tags") for the image.

In a first iteration, the first embedding for the first textual snippet can be applied as input to a trained machine learning model, and processed using the model to generate a first measure for the first textual snippet. In the first iteration, the second embedding for the second textual snippet can then be applied as input to the trained machine learning model, and processed using the model to generate a second measure for the second textual snippet. The third embedding and the fourth embedding can also be applied as input to the trained machine learning model, and processed using the model to generate third and fourth measures for respective of the third and fourth textual snippets. Further, the fifth embedding can be applied as input to the trained machine learning model, and processed using the model to generate a fifth measure for the image. The trained machine learning model is trained to predict whether to include content items in a composite response, and the measures can each indicate a desirability of including the corresponding content item. Optionally, other feature(s) can be applied as additional input and processed with each of the embeddings. For example, for the first textual snippet, feature(s) can be applied as input that indicate: a relevance score for the first textual snippet (e.g., provided by the first content agent), whether content of the first textual snippet has been mentioned in the current dialog and/or in a prior dialog of the user, feature(s) related to already chosen textual snippets for the composite response (which will be none in the first iteration), etc. The content item with a corresponding measure that satisfies one or more thresholds (e.g., a "default" threshold and a threshold relative to other measure(s)) can be selected for inclusion in the group in the first iteration. For instance, "WEP and WPA are encryption protocols to secure your wireless connection, and WPA2 is a new version of WPA" can be selected in the first iteration.

In a second iteration, the second embedding for the second textual snippet can be applied as input to the trained machine learning model, and processed using the model to generate an additional second measure for the second textual snippet. The third embedding and the fourth embedding can also be applied as input to the trained machine learning model, and processed using the model to generate additional third and fourth measures for respective of the third and fourth textual snippets. Further, the fifth embedding can be applied as input to the trained machine learning model, and processed using the model to generate an additional fifth measure for the image. As described above, other features can also be applied as additional input and processed with each of the embeddings. As also described above, such other features can include feature(s) based on content item(s) that have already been selected for inclusion in the group, which can cause the measures generated for the second, third, and fourth textual snippets—and for the image, to vary in the second iteration, relative to their measures in the first iteration. The textual snippet with a corresponding measure that satisfies one or more thresholds (e.g., a "default" threshold and a threshold relative to other measure(s)) can be selected for inclusion in the group in the second iteration. For instance "WPA2 is the most secure encryption standard, and should be used if your router and wireless card support it" can be selected in the second iteration.

In a third iteration, the third embedding for the third textual snippet can be applied as input to the trained machine learning model, and processed using the model to generate yet a further third measure for the third textual snippet. The fourth embedding can also be applied as input to the trained machine learning model, and processed using the model to generate yet a further fourth measure for the fourth textual snippet. Further, the fifth embedding can be applied as input to the trained machine learning model, and processed using the model to generate a further fifth measure for the image. As described above, other features can also be applied as additional input and processed with each of the embeddings, which can cause the measures generated for the third and fourth textual snippets, and the image, to vary in the third iteration, relative to their measures in the first and second iterations. At the third iteration, it can be determined that the measures generated for the third and fourth textual snippets, and the image, in the third iteration fail to satisfy a threshold (e.g., a "default" threshold) and, as a result, determining the group of content items can halt, and the group can be restricted to the first and second textual snippets.

Some implementations described herein additionally or alternatively generate, in response to user interface input, expanded responses that include a pertinent fact or characteristic about at least one entity of interest determined based on the user interface input and/or that include a prompt for further engagement, where the prompt for further engagement is based on an additional entity that is related to the at least one entity of interest, but that is not explicitly referenced in the user interface input. For example, the additional entity can be a defined attribute for the at least one entity of interest. As another example, the additional entity can be an additional entity that is not a defined attribute for the at least one entity of interest, but that includes a large quantity of shared attributes with the at least one entity of interest. Such expanded responses can be provided in lieu of composite responses described herein and/or all or parts of such expanded responses can be one of the candidate textual snippets (or other content items) considered for inclusion in composite responses described herein.

In implementations where an expanded response includes a prompt for further engagement that is based on an additional entity that is related to the at least one entity of interest, the additional entity can be identified with reference to an entity database that defines various entities and relationships between those various entities. One example of such an entity database is a knowledge graph that includes nodes that represent known entities, as well as edges that connect the nodes and represent relationships between the entities. For example, a knowledge graph can have a node that corresponds to "Hypothetical Movie" (a made-up movie provided for example purposes in this description), and that node can be connected, by edges, to other nodes that define attributes for "Hypothetical Movie". For example, "Hypothetical Movie" can be connected to a "Jane Doe" (a made-up director provided for example purposes in this description) node by a "directed by" edge to indicate that "Hypothetical Movie" is "directed by" "Jane Doe". In some implementations, an expanded response that includes a pertinent fact and/or a prompt for further engagement can be generated based on a stored template that is assigned to a class of the at least one entity of interest. The stored template can include fixed text and variables, and the response can be generated by determining values, that are specific to the at least one entity of interest, for the variables of the stored template.

As a working example, assume a user provides user interface input of "Assistant, what do you think about Hypothetical Movie?". An entity corresponding to "Hypothetical Movie" can be determined as the entity of interest, and a template for "Movies" identified based on "Hypothetical Movie" having a class of "Movies". For example, the template can be "[movie] was great! [fun_fact]. Anyway, do you watch a lot of [collection] films?", where brackets indicate variables to be generated by determining values that are specific to the "Hypothetical Movie" entity of interest. For example, the value for "[movie]" can be the alias "Hypothetical Movie" and the value for "[collection]" can be "comedy", a defined attribute for "Hypothetical Movie" (e.g., as a result of a "collection" edge for the node corresponding to "Hypothetical Movie" being most strongly associated with a "comedy" node (e.g., in lieu of other genres such as "action", "horror", etc.)). The value for "[fun_fact]" can be determined based on a curated list and/or automatically determined list of interesting facts. For example, a fact can be automatically determined for "Hypothetical Movie" based on two attributes for the entity such as the attributes of "comedy" for a "collection" edge and "special effects" for an "awards" edge. For instance, the automatically determined fact can be "Hypothetical Movie is a comedy and won an award for special effects". This automatically determined fact can be flagged as interesting based on the attributes: each, individually, occurring relatively frequently as attributes among a corpus of entities of the same class (e.g., many movies are comedies and many movies win awards); and/or co-occurring relatively infrequently as attributes among the corpus of entities of the same class (e.g., it's rare that a movie is both a comedy and a special effects award winner). Occurring relatively frequently as an attribute can be, for example, occurring as an attribute for more than 3%, 6%, 10%, 20% or other threshold. Co-occurring relatively infrequently can be, for example, co-occurring as attributes for less than 5%, 2%, 1%, or other threshold.

When a user responds to a prompt for further engagement with affirmative user interface input (e.g., that indicates a positive response to the prompt), a further response can be generated to continue the dialog, where the further response can be generated based on a further entity related to the additional entity (used to generate the prompt). For example, the further entity can be one that has the additional entity as an attribute. The further response can optionally include a further prompt related to the further entity to further guide and encourage continuance of the dialog. As one example, and continuing with the preceding working example, assume a user responds to the prompt "do you watch a lot of comedy films?" with "yes". In response, a further response can be generated based on a further entity that has "comedy" as an attribute, such as a further movie entity that has "comedy" as an attribute and that also has one or more other attributes in common with the original entity of interest ("Hypothetical Movie"). For example, the further response can be "Have you seen Theoretical Movie? [image of Theoretical Movie] It's a comedy and it also won a special effects award.", where [image of Theoretical Movie] can be an image from the cover of the movie. If the user responds to the further response with further user interface input, a yet further response can be generated. In some situations, the yet further response can be one that pivots back to the original entity of interest ("Hypothetical Movie") or the intervening entity of interest ("comedy movies"). As another example, the further response can be "Do you want to watch Theoretical Movie? [image of Theoretical Movie] It's also a comedy and it also won a special effects award." If the user responds to the further response with affirmative user interface input, the automated assistant can cause the client device to connect the client device to a server for streaming "Theoretical Movie".

In some implementations, with appropriate permissions and when a user responds to a prompt for further engagement with affirmative user interface input, a profile corresponding to the user can optionally be updated to reflect affinity for the attribute and/or increased affinity for the attribute. In some of those implementations, the profile can also optionally be updated to reflect affinity and/or increase affinity for any recently mentioned entities of the dialog that also have that attribute. Updating such a profile can influence automated assistant responses that are generated in future dialogs with the user.

When a user responds to a prompt for further engagement with negative user interface input (e.g., that indicates a negative response to the prompt), a further response can be generated to continue the dialog, where the further response can be generated based on an alternative entity that is another defined attribute of the original entity of interest. In other words, the further response can pivot back to the original topic of interest in view of the negative user interface input. The further response can optionally include a further prompt related to the alternative entity to further guide and encourage continuance of the dialog. In some implementations, with appropriate permissions and when a user responds to a prompt for further engagement with negative user interface input, a profile corresponding to the user can optionally be updated to remove any affinity for the attribute and/or decrease a degree of affinity for the attribute. In some of those implementations, the profile can also optionally be updated to remove any affinity and/or decrease a degree of affinity for any recently mentioned entities of the dialog that also have that attribute.

Some implementations described herein additionally or alternatively determine an engagement measure that indicates desirability of providing an expanded response, such as a composite response and/or a response that includes a prompt for further engagement of a user. In some of those implementations, the engagement measure can be used to determine whether any expanded response is provided. In some additional or alternative implementations, the engagement measure can be used to determine how a prompt for further engagement is provided. For example, for an engagement measure that indicates a high desirability of providing a response that includes a prompt, the prompt can be included as an explicit question in the response (e.g., read aloud in an audible rendering of the response). On the other hand, for an engagement measure that indicates a medium desirability of providing a response that includes a prompt, the prompt may be provided as a "suggestion chip" or other selectable element that forms part of the response (e.g., selectable element of "Chat about [entity]"), but that is not read aloud and/or is visually demoted (e.g., presented below) relative to other parts of the response. In some additional or alternative implementations, the engagement measure is used in determining a quantity of textual snippets (and/or other content items) to include in a composite response. For example, the engagement measure can be applied as an additional input to a trained machine learning model utilized in determining which snippets to include in a group for generating a composite response and, through training of the model based on such an additional input, learned parameters of the machine learning model can be trained based on such additional input.

In various implementations where an engagement measure is generated, it can optionally be generated based on a trained machine learning model and can be personalized to the user (e.g., based on training the model using training instances specific to the user and/or based on applying historical inclinations of the user as part of the input to the model). Various inputs can be processed using the model in determining an engagement measure at a given time. For example, the various inputs can include one or multiple of: one or more terms included in the most recent user interface input in the dialog, voice characteristics of the user in providing the most recent user interface input (when it is voice input), a type of the client device being used to engage in the dialog (e.g., automobile client device, mobile phone, stand-alone voice activated speaker, tablet), past interactions of the user via the client device (e.g., frequency of explicitly indicating a desire for expanded responses, average duration of past dialogs, etc.), a time of day, a day of the week, a type of background noise, a noise level of the background noise, a class of the current entity of interest, etc. The trained machine learning model can be, for example, a classifier. The trained machine learning model can optionally be trained based on supervised training data with labels generated based on explicitly asking user(s) whether responses that include a prompt and/or responses that are composite response are desired in the given context(s). The trained machine learning model can additionally and/or alternatively be trained based on semi-supervised training data with labels generated implicitly based on duration of dialogs in different contexts.

Through use of an engagement measure, expanded responses can be selectively provided and/or provided in a manner that is tailored to the engagement measure. This promotes efficient usage of resources through providing expanded responses that guide dialog when an engagement measure satisfies certain criterion/criteria, while providing expanded responses in a less resource intensive manner (e.g., as suggestion chips in lieu of audibly rendered prompts) or not at all when the engagement measure satisfies other certain criterion/criteria.

Expanded responses generated and rendered according to implementations disclosed herein promote continuance of a human-to-computer dialog, and can guide the continuance in a manner that promotes resource efficient discovery of related topics and/or resource efficient performance of technical tasks. In various implementations, expanded responses generated and rendered according to implementations disclosed herein can relieve a user of affirmatively providing multiple user interface inputs. Additionally, expanded responses generated and provided for rendering according to implementations disclosed herein may lead to performance of a technical task that may have otherwise required multiple instances of user interface input to solicit.

The above description is provided as an overview of various implementations. Those, and other implementations, are described in more detail herein.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

BRIEF DESCRIPTION OF THE DRAWINGS

FIG. 8, FIG. 9, FIG. 10, and FIG. 1I each depict example dialogs between a user and an automated assistant, in which response(s) that include prompts for further engagement can be provided.

DETAILED DESCRIPTION

Figure 1:
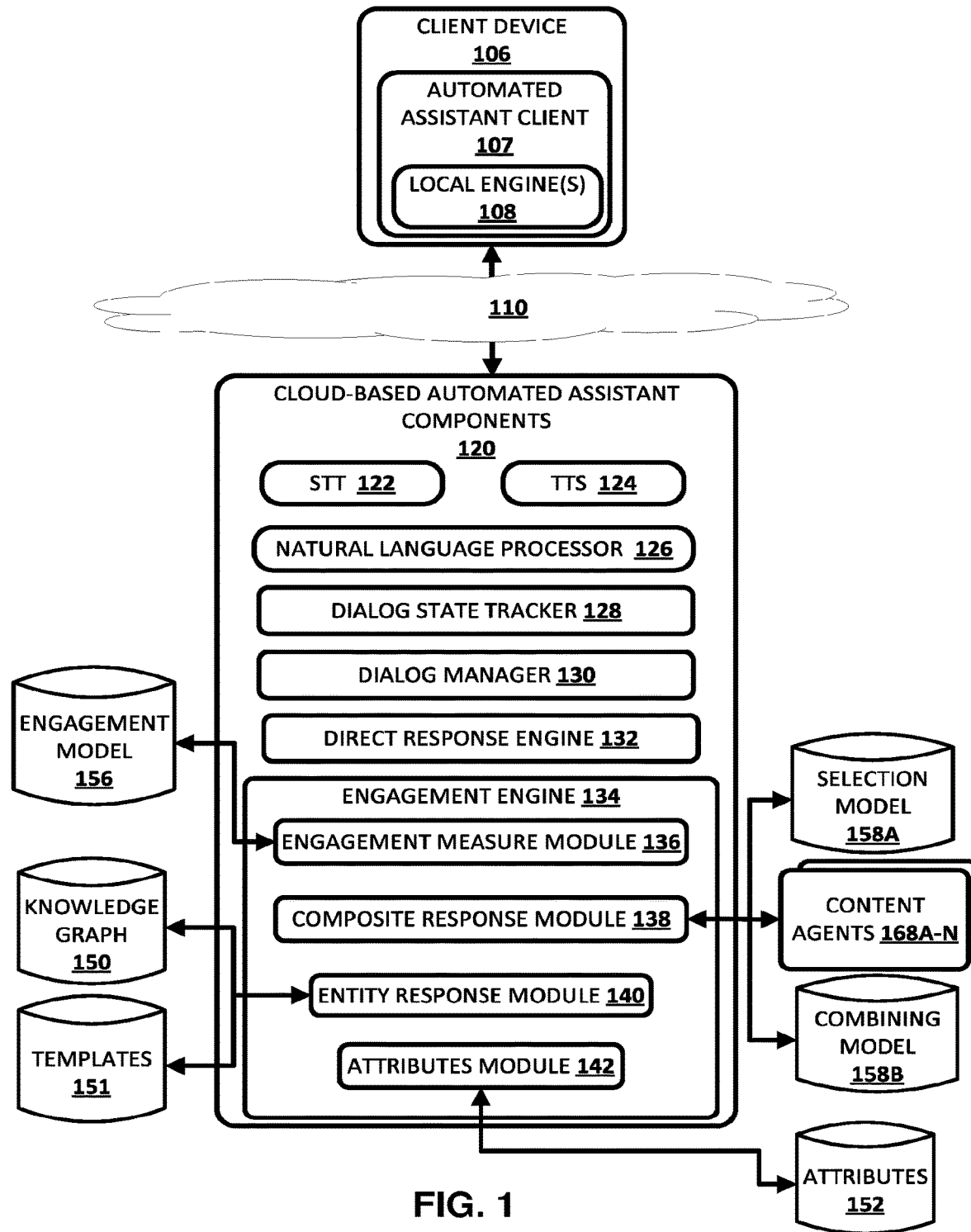
FIG. 1 is a block diagram of an example environment in which implementations disclosed herein may be implemented.

Now turning to FIG. 1, an example environment in which techniques disclosed herein may be implemented is illustrated. The example environment includes a client device 106, which executes an instance of an automated assistant client 107. One or more cloud-based automated assistant components 120 can be implemented on one or more computing systems (collectively referred to as a "cloud" computing system) that are communicatively coupled to client device 106 via one or more local and/or wide area networks (e.g., the Internet) indicated generally at 110.

An instance of an automated assistant client 107, by way of its interactions with one or more cloud-based automated assistant components 120, may form what appears to be, from the user's perspective, a logical instance of an automated assistant with which the user may engage in a human-to-computer dialog. It thus should be understood that in some implementations, a user that engages with an automated assistant client 107 executing on client device 106 may, in effect, engage with his or her own logical instance of an automated assistant. For the sakes of brevity and simplicity, the term "automated assistant" as used herein as "serving" a particular user will often refer to the combination of an automated assistant client 107 executing on a client device 106 operated by the user and one or more cloud-based automated assistant components 120 (which may be shared amongst multiple automated assistant clients of multiple client computing devices). It should also be understood that although only a single client device 106 is illustrated in FIG. 1 for simplicity, in various implementations a user can engage with cloud-based automated assistant components 120 via any of a variety of an "ecosystem" of client devices of the user.

The client computing device 106 may be, for example: a desktop computing device, a laptop computing device, a tablet computing device, a mobile phone computing device, a computing device of a vehicle of the user, a standalone interactive speaker devoted to assistant interactions, a stand-alone interactive speaker/display combo devoted to assistant interactions, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 106 may optionally operate one or more other applications that are in addition to automated assistant client 107, such as a message exchange client (e.g., SMS, MMS, online chat), a browser, and so forth. In some of those various implementations, one or more of the other applications can optionally interface (e.g., via an application programming interface) with the automated assistant application 107, or include their own instance of an automated assistant application (that may also interface with the cloud-based automated assistant component(s) 120. As mentioned above, in some implementations, a given user may interact with cloud-based automated assistant component(s) 120 utilizing a plurality of client computing devices that collectively from a coordinated "ecosystem" of computing devices. However, for the sake of brevity, some examples described in this specification will focus on a user operating a single client computing device 106.

An automated assistant, by way of automated assistant client 107 and cloud-based automated assistant components 120, engages in human-to-computer dialog sessions with a user via user interface input and output devices of the client device 106. To preserve user privacy and/or to conserve resources, in many situations a user must often explicitly invoke the automated assistant before the automated assistant will fully process a spoken utterance. The explicit invocation of the automated assistant can occur in response to certain user interface input received at the client device 106. For example, user interface inputs that can invoke the automated assistant via the client device 106 can optionally include actuations of a hardware and/or virtual button of the client device 106.

Moreover, the automated assistant client 107 can include one or more local engines 108, such as an invocation engine that is operable to detect the presence of one or more spoken invocation phrases. The invocation engine can invoke the automated assistant in response to detection of one of the spoken invocation phrases. For example, the invocation engine can invoke the automated assistant in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 106, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant. As used herein, "invoking" the automated assistant can include causing one or more previously inactive functions of the automated assistant to be activated. For example, invoking the automated assistant can include causing one or more local engines 108 and/or cloud-based automated assistant components 120 to further process audio data frames based on which the invocation phrase was detected, and/or one or more following audio data frames (whereas prior to invoking no further processing of audio data frames was occurring). In many implementations, automated assistant 120 may engage interactive voice response ("IVR"), such that the user can utter commands, searches, etc., and the automated assistant may utilize natural language processing and/or one or more grammars to convert the utterances into text, and respond to the text accordingly.

The one or more local engine(s) 108 of automated assistant client 107 are optional, and can include, for example, the invocation engine described above, a local speech-to-text ("STT") engine (that converts captured audio to text), a local text-to-speech ("TTS") engine (that converts text to speech), a local natural language processor (e.g., that determines semantic meaning of text), and/or other local components. Because the client device 106 is relatively constrained in terms of computing resources (e.g., processor cycles, memory, battery, etc.), the local engines 108 may have limited functionality relative to any counterparts that are included in cloud-based automated assistant components 120.

Cloud-based automated assistant components 120 leverage the virtually limitless resources of the cloud to perform more robust and/or more accurate processing of audio data, and/or other user interface input, relative to any counterparts of the local engine(s) 108. Again, in various implementations, the client device 106 can provide audio data and/or other data to the cloud-based automated assistant components 120 in response to the invocation engine detecting a spoken invocation phrase, or detecting some other explicit invocation of the automated assistant.

The illustrated cloud-based automated assistant components 120 include a cloud-based TTS module 124, a cloud-based STT module 122, a natural language processor 126, a dialog state tracker 128, a dialog manager 130, a direct response engine 132, and an engagement engine 134. In some implementations, one or more of the engines and/or modules of cloud-based automated assistant 120 may be omitted, combined, and/or implemented in a component that is separate from cloud-based automated assistant 120. As one non-limiting example, in some implementations dialog manager 130 and all or portions of engagement engine 134 (e.g., at least portions of composite response module 138) can be combined. Further, in some implementations cloud-based automated assistant 120 can include additional and/or alternative engines and/or modules.

Cloud-based STT module 122 can convert audio data into text, which may then be provided to natural language processor 126. Cloud-based TTS module 124 can convert textual data (e.g., natural language responses formulated by direct response engine 132 and/or engagement engine 134) into computer-generated speech output. In some implementations, TTS module 124 may provide the computer-generated speech output to client device 106 to be output directly, e.g., using one or more speakers. In other implementations, textual data generated by cloud-based automated assistant components 120 may be provided to one of the local engine(s) 108, which may then convert the textual data into computer-generated speech that is output locally.

Natural language processor 126 processes free form natural language input and generates, based on the natural language input, annotated output for use by one or more other components. For example, the natural language processor 126 can process natural language free-form input that is textual input that is a conversion, by STT module 122, of audio data provided by a user via client device 106. The generated annotated output may include one or more annotations of the natural language input and optionally one or more (e.g., all) of the terms of the natural language input.

In some implementations, the natural language processor 126 is configured to identify and annotate various types of grammatical information in natural language input. For example, the natural language processor 126 may include a part of speech tagger (not depicted) configured to annotate terms with their grammatical roles. Also, for example, in some implementations the natural language processor 126 may additionally and/or alternatively include a dependency parser (not depicted) configured to determine syntactic relationships between terms in natural language input.

In some implementations, the natural language processor 126 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 126 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with knowledge graph 150 or other entity database to resolve a particular entity. In various implementations, output from the entity tagger of the natural language processor 126 can be utilized to determine an entity of interest that is used by engagement engine 134 as described herein.

In some implementations, the natural language processor 126 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 126 may rely on annotations from one or more other components of the natural language processor 126. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 126 may use related prior input and/or other related data outside of the particular natural language input to determine one or more annotations.

In some implementations, dialog state tracker 128 may be configured to keep track of a "dialog state" that includes, for instance, a belief state of a one or more users' goals (or "intents") over the course of a human-to-computer dialog session and/or across multiple dialog sessions. In determining a dialog state, dialog state tracker 128 may seek to determine, based on user and system utterances in a dialog session, the most likely intent and/or most likely value(s) for slot(s) for the intent (if any). In some situations, the dialog state tracker 128 can determine a current explicit intent of the user to receive one or more expanded responses described herein based on determining that at least one entity of interest is indicated by user interface input in the dialog, and that the user interface input includes an explicit indication to "chat" about the entity of interest (e.g., "what do you think about", "tell me more about", "how do you feel about", "let's chat about"). In other situations, the dialog state tracker 128 can determine a current intent that does not lend itself to any expanded responses, such as an intent of "current time", "current weather", "control peripheral device", "call contact", "message contact", etc.

Dialog manager 130 may be configured to map a current dialog state, e.g., provided by dialog state tracker 128, to one or more "responsive actions" of a plurality of candidate responsive actions that are then performed by the direct response engine 132 and/or the engagement engine 134. Responsive actions may come in a variety of forms, depending on the current dialog state. For example, for many intents, a responsive action can include only a responsive action performed by direct response engine 132. For instance, for an intent of "messaging a contact", only the direct response engine 132 may be invoked to, for instance, request that the user provide parameters for the message (e.g., which contact, what's the message) and/or to cause the message to be sent for the contact. However, for some intents, a responsive action can include potential generation of an expanded response by engagement engine 134. For those intents, the dialog manager 130 can provide the engagement engine 134 with an indication of a current entity of interest. As described in more detail below, the engagement engine 134 can then potentially (e.g., if an engagement measure satisfies a threshold) generate an expanded response for providing responsive to the most recent user interface input on which the intent is based. The expanded response can be provided for rendering at the client device 106 in response to the user interface input, either alone or in combination with a direct response from the direct response engine 132 (e.g., when an intent also invokes the direct response engine 132).

Turning now to engagement engine 134, it includes an engagement measure module 136, a composite response module 138, an entity response module 140, and an attributes module 142. In some implementations, one or more of the modules of engagement engine 134 may be omitted, combined, and/or implemented in a component that is separate from cloud-based automated assistant components 120. For example, engagement measure module 136 can be implemented by client device 106 in various implementations. Also, for example, in various implementations engagement engine 134 can include one of composite response module 138 and entity response module 140, but not the other. Further, in some implementations engagement engine 134 can include additional and/or alternative modules.

Engagement measure module 136 utilizes trained engagement model 156 to determine an engagement measure that indicates desirability of providing an expanded response, such as a composite response and/or a response that includes a prompt for further engagement of a user. In some of those implementations, the engagement measure module 136 uses the engagement measure to determine whether any expanded response is provided. For example, if the dialog manager 130 provided an indication to engagement engine 134 that an expanded response could possibly be provided, but has not been explicitly requested, the engagement measure module 136 can use the engagement measure to determine whether to provide any expanded response. Although the dialog manager 130 and engagement engine 134 are illustrated as separate components in FIG. 1, in various implementations one or more (e.g., all) aspects of engagement engine 134 can be incorporated as part of dialog manager 130. For example, in some of those implementations at least aspects of the functionality of composite response module 138 can be incorporated as part of dialog manager 130.

In some additional or alternative implementations, the engagement measure module 136 utilizes the engagement measure to determine how a prompt for further engagement is provided in a response. For example, for an engagement measure that indicates a high desirability of providing a response that includes a prompt, the engagement measure module 136 can cause the prompt to be included as an explicit question in a generated expanded response (e.g., read aloud in an audible rendering of the response). On the other hand, for an engagement measure that indicates a medium desirability of providing a response that includes a prompt, the engagement measure module 136 can cause the prompt to be provided as a "suggestion chip" or other selectable element that forms part of the response, but that is not read aloud and/or is visually demoted (e.g., presented below) relative to other parts of the response. In some additional or alternative implementations, the engagement measure module 136 provides the engagement measure to composite response module 138, which utilizes the engagement measure in determining a quantity of textual snippets (and/or other content items) to include in a composite response.

As mentioned above, the engagement measure module 136 can use engagement model 156 in generating an engagement measure. The engagement model 156 can be a trained machine learning model and various inputs can be processed using the engagement model in determining an engagement measure at a given time. For example, the various inputs can include one or multiple of: one or more terms included in the most recent user interface input in the dialog, voice characteristics of the user in providing the most recent user interface input (when it is voice input), a type of the client device being used to engage in the dialog (e.g., automobile client device, mobile phone, stand-alone voice activated speaker, tablet), past interactions of the user via the client device (e.g., frequency of explicitly indicating a desire for expanded responses, average duration of past dialogs, etc.), a time of day, a day of the week, a type of background noise, a noise level of the background noise, a class of a current entity of interest, other feature(s) of the current entity of interest, and/or other input(s).

The engagement model 156 can optionally be trained based on supervised training data with labels generated based on explicitly asking user(s) whether responses that include a prompt and/or responses that are composite responses are desired in the given context(s). In such a situation, the given contexts can be used to generate input for training instances (e.g., what type of device was being used in a given context, what was the noise level of background noise) and labels generated based on the responses to the prompts used as labeled outputs for the training instances (e.g., a "1" or other positive value if the response indicates expanded responses are desired, a "0" or other negative value if the response indicates expanded responses are not desired). The trained machine learning model can additionally and/or alternatively be trained based on semi-supervised training data with labels generated implicitly based on duration of dialogs in different contexts. The engagement measure determined for a user can optionally be personalized to the user. This can be achieved through training of the engagement model 156 based on training data that is specific to the user. This can include training solely based on such user-specific data, or adapting a globally trained model based on such user-specific data. This can additionally or alternatively be achieved through training based on input(s) that are personalized to users (but not identifiable to the users) and use of such input(s) during inference.

The composite response module 138 generates an expanded response that is a composite response. The composite response is generated based on at least one current entity of interest that can be determined by natural language processor 126 as described herein, and provided to engagement engine 134 by dialog manager 130. The composite response module 138 interfaces with content agents 168A-N, selection model 158A, and combining model 158B in generating a composite response. Additional description of implementations of composite response module are described herein (e.g., with reference to FIG. 2 and FIG. 3B).

Entity response module 140 generates expanded responses that include a pertinent fact about at least one entity of interest determined based on the user interface input and/or that include a prompt for further engagement, where the prompt for further engagement is based on an additional entity that is related to the at least one entity of interest, but that is not explicitly referenced in the user interface input. In generating such a response, the entity response module 140 can utilize knowledge graph 150 (and/or other entity database(s)) and optionally templates of templates database 151. The entity response module 140 can generate further responses following the response, where the further responses are generated dynamically in dependence on user interface input received in response to the initial response (if any) and/or based on entity/entities of prior user inputs and responses of the dialog session. Additional description of implementations of entity response module 140 are described herein. For example, in various implementations entity response module 140 can perform one or more blocks of method 700 of FIG. 7.

Attributes module 142 can, with appropriate permissions from a user, update attributes assigned to a user in attributes database 152, in dependence on the user's responses to prompts provided in responses generated by entity response module 140 and/or composite response module 138. For example, if entity response module 140 generates a response that includes a prompt of "Do you like movies directed by Jane Doe?" and the user provides affirmative user interface input, the attributes module 142 can update attributes assigned to the user, in attributes database 152, to define an affinity of the user for movies directed by "Jane Doe" and/or to increase an already defined affinity for such movies. Also, for example, if entity response module 140 generates a response that includes a prompt of "Do you like action movies" and the user provides negative user interface input, the attributes module 142 can update attributes assigned to the user, in attributes database 152, to remove any affinity for action movies defined for the user or to decrease an already defined affinity for action movies. Attributes for a user that are updated by attributes module 142 can be utilized, for example, by an automated assistant in engaging in future dialogs with the user.

Figure 2:
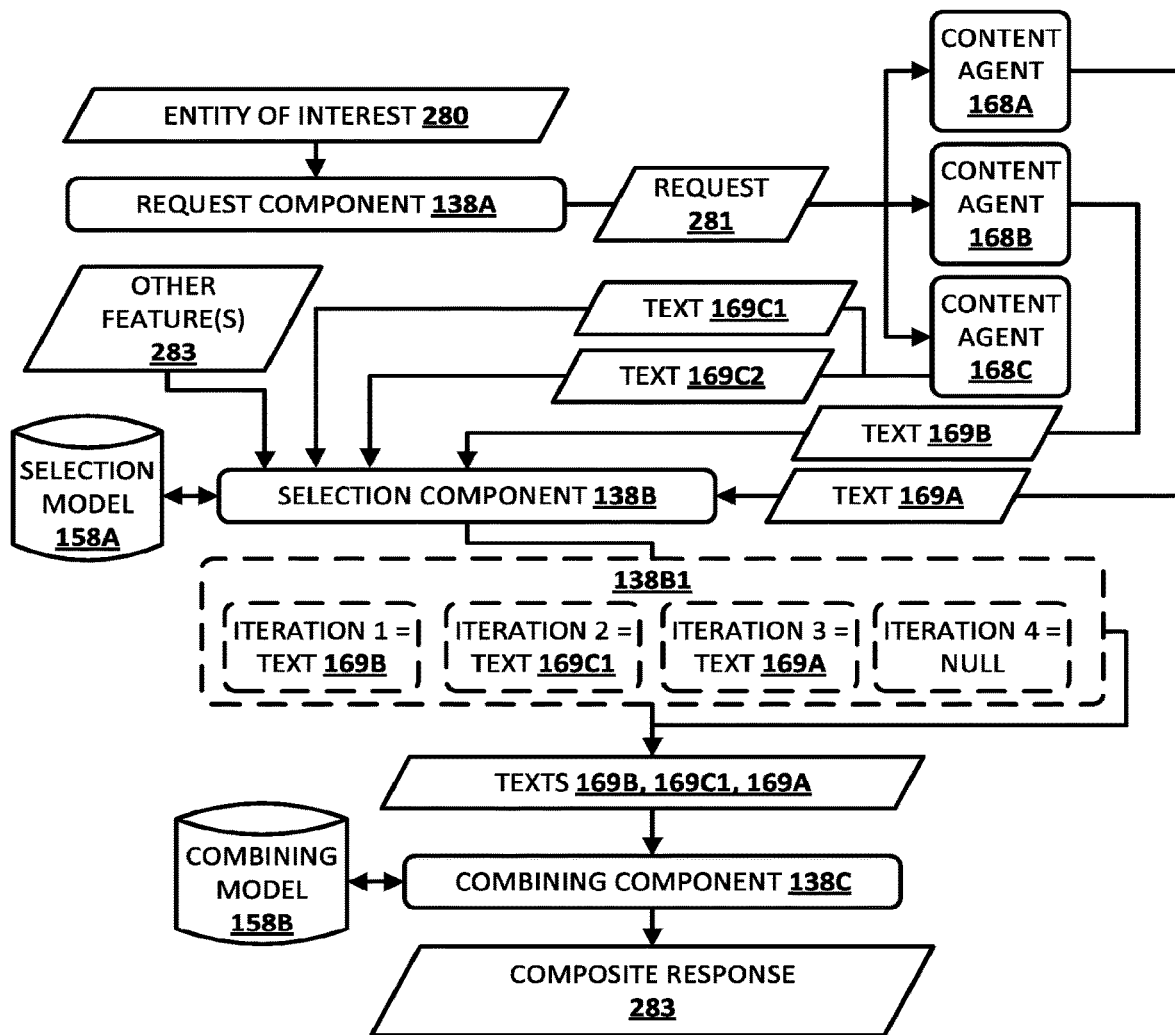
FIG. 2 illustrates example components of composite response module of FIG. 1, and an example of how those components can generate a composite response for providing in continuance of a human-to-computer dialog.

FIG. 2 illustrates example components of composite response module 138 of FIG. 1. In particular, FIG. 2 illustrates example request component 138A, selection component 138B, and combining component 138C, which can be components of composite response module 138.

In FIG. 2, request component 138A receives an entity of interest 280. The entity of interest 280 can be received, for example, from dialog manager 130 (FIG. 1) and can be determined based on output from an entity tagger of natural language processor 126 (FIG. 1). The request component 138A generates a request 281 based on the entity of interest 280, and transmits the request 281 to each of content agents 168A-C. In some implementations, the request 281 includes an alias or other identifier of the entity of interest. Although only a single request 281 is illustrated, in other implementations disparate requests can be transmitted to the disparate content agents 168A-C (e.g., each request can include an identifier of the entity of interest 280, but can vary in format and/or content in dependence on the content agent). In some implementations, the request component 138A selects the content agents 168A-C, from a larger corpus of content agents, based at least in part on the entity of interest 280 (e.g., based on a class of the entity of interest 280).

In response to the request 281, the content agent 168A provides responsive text 169A, the content agent 168B provides responsive text 169B, and the content agent 168C provides responsive text 169C1 and responsive text 169C2. The texts 169A, 169B, 169C1, and 169C2 are provided to the selection component 138B, optionally along with other feature(s) 283. Other feature(s) 283 can include, for example, the engagement measure described herein, relevance scores for the corresponding textual snippets, whether content of the corresponding textual snippets have been mentioned in the current dialog and/or in a prior dialog of the user, feature(s) related to already chosen textual snippets for the composite response (which will be none in a first iteration), etc.

In some implementations, the selection component 138B generates a corresponding embedding for each of the texts 169A, 169B, 169C1, and 169C2. Each embedding can be generated based on processing tokens of the textual snippet over an RNN model, such as an RNN model that is separate from selection model 158A, or that is incorporated as part of selection model 158A.

The selection component 138B can select the texts to include in a group over a plurality of iterations, generally indicated in FIG. 2 as 138B1. In a first iteration, an embedding for text 169A is applied as input to layers of the selection model 158A along with current other feature(s) 283, and processed using the model 158A to generate a measure for the text 169A. Further, in the first iteration an embedding for text 169B is applied as input to layers of the selection model 158A along with current other feature(s) 283, and processed using the model 158A to generate a measure for the text 169B. Yet further, in the first iteration an embedding for text 169C1 is applied as input to layers of the selection model 158A along with current other feature(s) 283, and processed using the model 158A to generate a measure for the text 169C1. Still further, in the first iteration an embedding for text 169C2 is applied as input to layers of the selection model 158A along with current other feature(s) 283, and processed using the model 158A to generate a measure for the text 169C2. Text 169B is selected in the first iteration based on the measure for text 169B satisfying one or more thresholds (e.g., a "default" threshold and a threshold relative to other measure(s)).

In a second iteration, an embedding for text 169A is applied as input to layers of the selection model 158A along with current other feature(s) 283 (which can be updated based on selecting text 169B in the first iteration), and processed using the model 158A to generate a new measure for the text 169A. Further, in the second iteration an embedding for text 169C1 is applied as input to layers of the selection model 158A along with current other feature(s) 283, and processed using the model 158A to generate a new measure for the text 169C1. Yet further, in the second iteration an embedding for text 169C2 is applied as input to layers of the selection model 158A along with current other feature(s) 283, and processed using the model 158A to generate a new measure for the text 169C2. Text 169C1 is selected in the second iteration based on the measure for text 169C1 satisfying one or more thresholds (e.g., a "default" threshold and a threshold relative to other measure(s)).

In a third iteration, an embedding for text 169A is applied as input to layers of the selection model 158A along with current other feature(s) 283 (which can be further updated based on selecting text 169C1 in the second iteration), and processed using the model 158A to generate a new measure for the text 169A. Further, in the third iteration an embedding for text 169C2 is applied as input to layers of the selection model 158A along with current other feature(s) 283, and processed using the model 158A to generate a new measure for the text 169C:2. Text 169A is selected in the third iteration based on the measure for text 169A satisfying one or more thresholds (e.g., a "default" threshold and a threshold relative to other measure(s)).

In a fourth iteration, an embedding for text 169C2 is applied as input to layers of the selection model 158A along with current other feature(s) 283 (which can be yet further updated based on selecting text 169A in the third iteration), and processed using the model 158A to generate a new measure for the text 169C2. Text 169C2 is not selected based on the measure for text 169C2 failing to satisfy one or more thresholds (e.g., a "default" threshold).

The selection component 138B1 provides the texts 169B, 169C1, and 169A to combining component 138C. The combining component 138C utilizes a combining model 158B to combine the texts 1693, 169C1, and 169A into a composite response 283. Various combining models 158B can be utilized, such as generative models that are sequence-to-sequence models. For example, the sequence to sequence model can be one where tokens of texts can be applied, in order, as input to the model (e.g., on a token-by-token basis), and an encoding of the tokens generated over layers of the network. Further, the generated encoding can be decoded over additional layers of the network, where the resulting decoding indicates (directly or indirectly) a composite variant of the texts.

In some implementations, selection model 158A is deep neural network model trained using supervised training instances where human reviewers indicate labels for various texts, optionally in view of other features. In some implementations, the selection model 158A is a deep neural network model representing a trained policy, and the selection model 158A is trained based on rewards that are determined during reinforcement learning based on a reward function. The reinforcement learning can be based on prior human-to-computer dialog sessions of prior users, and the rewards can be determined based on implicit or explicit reactions of the prior users to prior composite responses. The prior composite responses can include prior textual snippets selected using the deep neural network model, and the prior composite responses can be ones rendered during the prior human-to-computer dialog sessions. The rewards function can seek to reward positive user reactions of the prior users, which can be determined, for example, based on sentiment of prior users' further input following the prior composite responses. The sentiment of further input can additionally or alternatively be based on, for example, textual analysis of the input, voice analysis of voice-based input, and/or other feature(s).

Although texts 169A-169C2 are described in the example of FIG. 2, in various implementations non-textual content items can additionally or alternatively be provided by one or more of content agents 168A-C and/or by other content agents. Such non-textual content items include, for example, images, video segments, emojis, etc. As one non-limiting example, a fourth content agent can also be provided in FIG. 2 and configured to return image(s) that are relevant to entity/entities of interest included in request 281. Such image(s) can be included in the items of content considered for selection by selection component 138B and, if selected, can be included in the composite response 283.

Figure 3A:
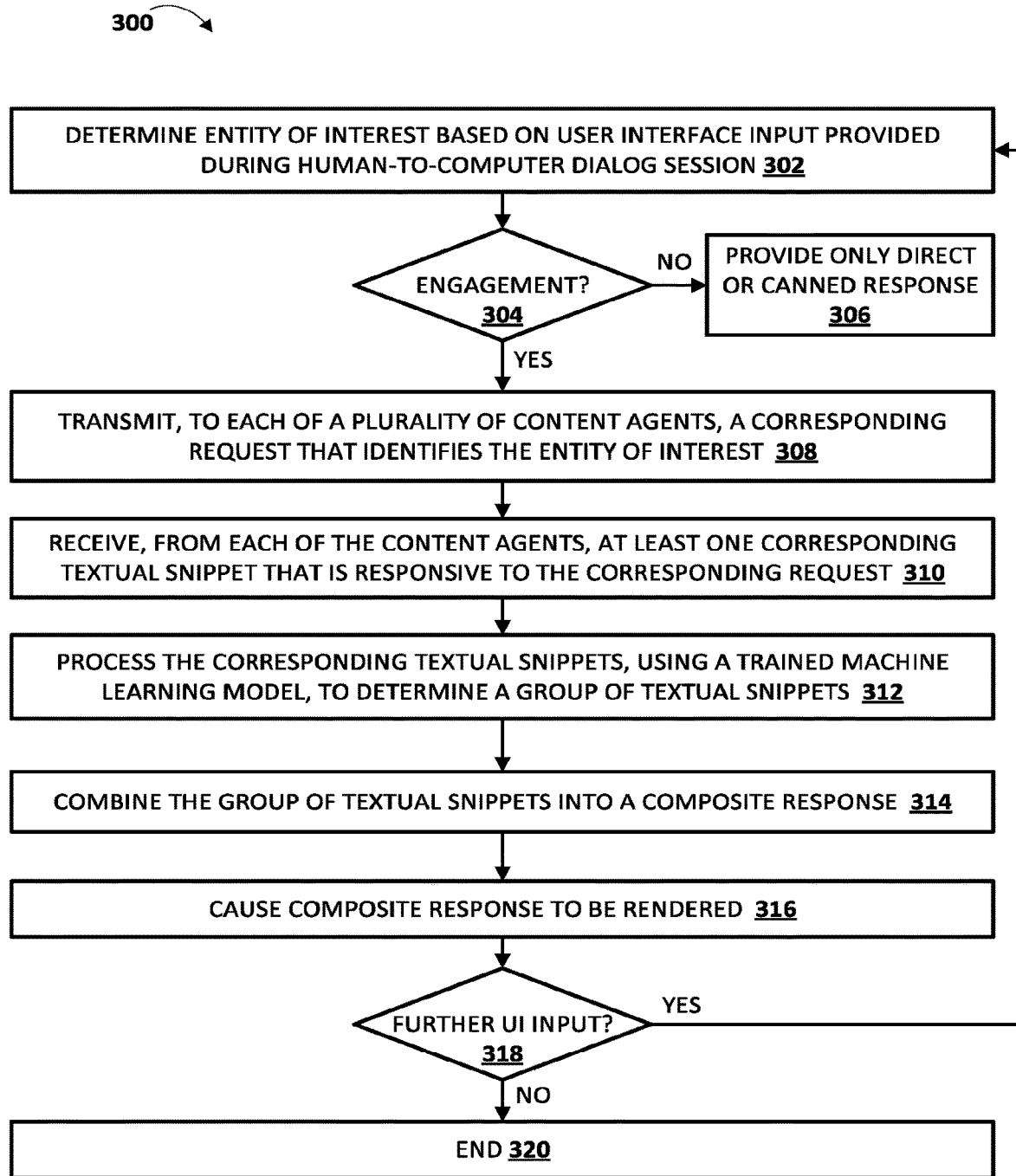
FIG. 3A depicts a flowchart illustrating an example method of guiding a human-to-computer dialog based on generating and providing at least one composite response.
Figure 3B:
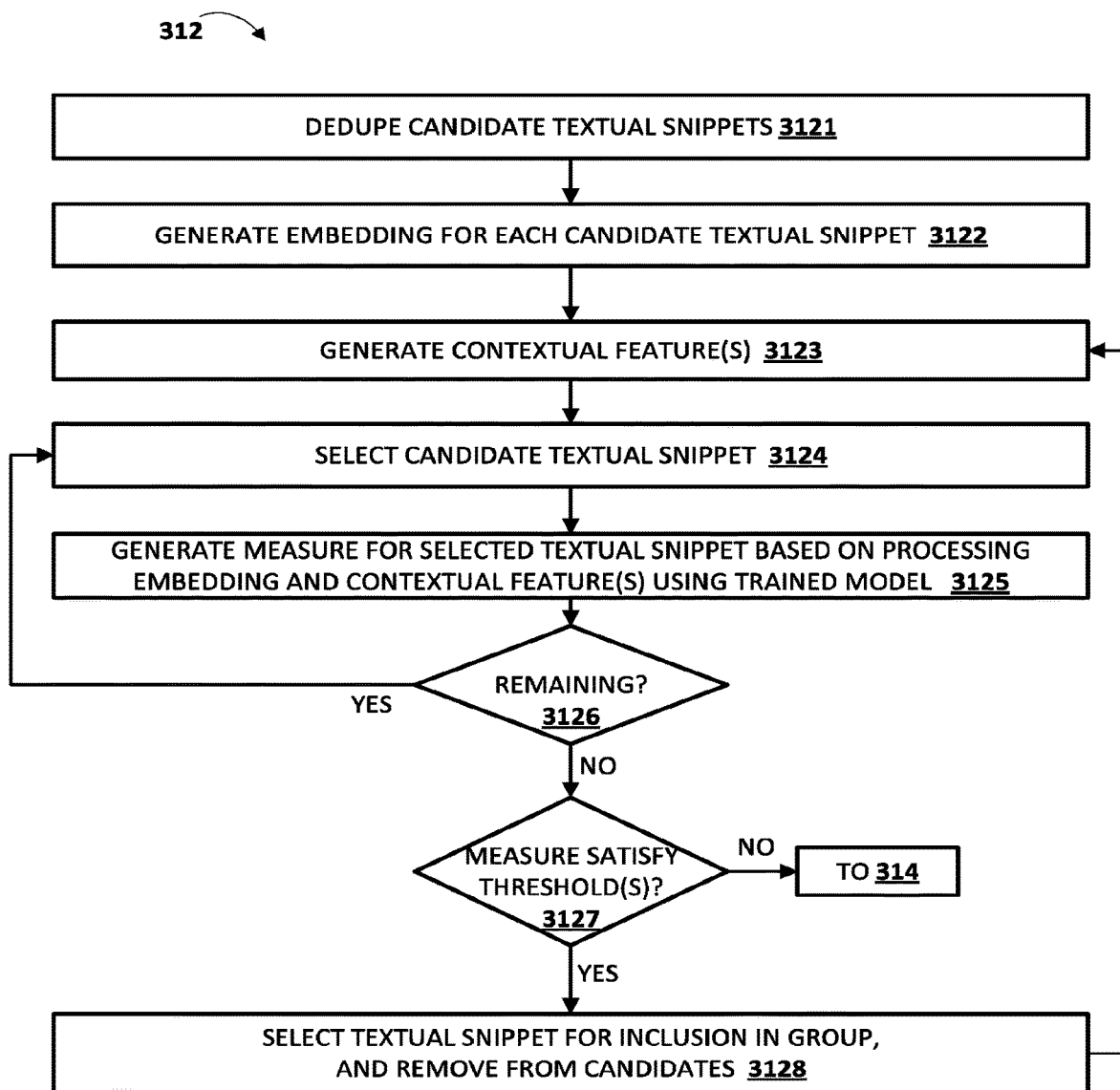
FIG. 3B depicts a flowchart illustrating an example of one block of the method of FIG. 3A.

FIG. 3A depicts a flowchart illustrating an example method 300 of guiding a human-to-computer dialog based on generating and providing at least one composite response. FIG. 3B depicts a flowchart illustrating an example of block 312 of the method 300 of FIG. 3A. For convenience, the operations of the flow charts of FIGS. 3A and 3B are described with reference to a system that performs the operations. This system may include various components of various computer systems, such as one or more cloud-based and/or local automated assistant components. Moreover, while operations of FIGS. 3A and 3B are shown in a particular order, this is not meant to be limiting. One or more operations may be reordered, omitted or added.

At block 302, the system determines an entity of interest based on user interface input provided during a human-to-computer dialog session. As a working example, the user interface input can be "Did you see the Hypothetical Sports Team game last night?". Based on such input, the system can determine an entity of interest that corresponds to the game that "Hypothetical Sports Team" played in "last night".

At block 304, the system determines whether an engagement measure satisfies a threshold. The engagement measure can be determined based on the user interface input and/or based on other signal(s). If, at block 304, the system determines the engagement measure does not satisfy a threshold, the system proceeds to block 306 and provides only a direct response or a canned response. For example, if the user interface input were instead "What was the score of Hypothetical Sports Team game last night?", the system may determine, absent other signals, that the engagement measure is not satisfied and provide only a direct response of a score of last night's game.

If, at block 304, the system determines the engagement measure does satisfy a threshold, the system proceeds to block 308. At block 308, the system transmits, to each of a plurality of content agents, a corresponding request that identifies the entity of interest. Continuing with the working example, each request can identify "last night's" game that involved "Hypothetical Sports Team". A first request can be transmitted to a first content agent that is focused on stats from recent sports match-ups, a second request can be transmitted to a second content agent that is focused on outcomes of recent sports matches, a third request can be transmitted to a third content agent that is focused on news titles, etc. In some implementations, the system selects the content agents to which requests are transmitted based on a class of the entity of interest. For example, the system can select a first set of content agents for an entity with a sports class, whereas the system selects a second set of content agents for an entity with a movie class.

At block 310, the system receives, from each of a plurality of the content agents, at least one corresponding textual snippet that is responsive to the corresponding request. Continuing with the working example, the system can receive a first textual snippet form the first agent, a second textual snippet from the second agent, and a third and fourth textual snippet from the third agent. In some implementations, at block 310 the system additionally or alternatively receives, from one or more of the plurality of content agents, at least one corresponding non-textual item of content.

At block 312, the system processes the corresponding textual snippets (and/or other content items), using a trained machine learning model, to determine a group of textual snippets (and/or other content items) to utilize in a composite response. Continuing with the working example, the system can determine a subgroup that includes the first, second, and third textual snippets, but that omits the fourth textual snippet. The subgroup can optionally be an ordered subgroup that is ordered based on the order of selection of the textual snippets for inclusion in the subgroup.

At block 314, the system combines the group of textual snippets (and/or other content items) into a composite response. In some implementations, the textual snippets are applied, in their order and on a token-by-token basis, to a generative model that is trained to combine textual snippets into a shortened and/or easier to comprehend combined response. In implementations where non-textual content items are included in the group, such content items can be appended to an end of combined textual snippets, to the beginning of the combined textual snippets, or incorporated between text of the combined textual snippets.

At block 316, the system causes the composite response to be rendered, by the client device, as a response from the automated assistant that is responsive to the user interface input of block 302.

At block 318, the system determines whether further user interface input is received in response to the rendering of the composite response. If not, the method 300 proceeds to block 320 and ends (until further user interface input is received in another dialog session). If so, the system proceeds back to block 302 and performs another iteration of method 30) for the current dialog session. It is noted that, in performing another iteration of method 300, the entity of interest may change based on the further user interface input. For example, and continuing with the working example, the further user interface input can be "do you think player X or player Y is better?", which can lead to new entities of interest that correspond to "player X" and "player Y".

Turning now to FIG. 3B, one implementation of block 312 of the method 300 of FIG. 3A is described in more detail.

At block 3121, the system optionally dedupes candidate textual snippets (and/or other content items) that were received at block 310 (FIG. 3A). Deduping can include removing excess candidate textual snippets (and/or other content items) that are the same as a remaining candidate textual snippet (and/or other content item) or that are sufficiently similar (e.g., semantically and/or on an edit-distance basis) to a remaining candidate textual snippet (and/or other content item).

At block 3122, the system generates an embedding for each candidate textual snippet (and/or other content item).

At block 3123, the system generates contextual feature(s) for a current iteration.

At block 3124, the system selects a candidate textual snippet (or other content item) from the candidates.

At block 3125, the system generates a measure for the selected textual snippet (or other content item) based on processing the embedding for the selected textual snippet (or other content item), and the contextual feature(s) for the current iteration, using a trained model.

At block 3126, the system determines if there are any remaining unprocessed candidate textual snippets (or other content items) for the current iteration. If so, the system returns to block 3124 and selects an unprocessed candidate textual snippet (or other content item), then generates a measure for the unprocessed candidate textual snippet (or other content item) at block 3125.

If, at block 3126, there are no remaining unprocessed candidate textual snippets (or other content items) for the current iteration, the system proceeds to block 3127.

At block 3127, the system determines whether the measure for any of the candidate textual snippets (or other content items) satisfies one or more thresholds. If not, block 312 ends and the system proceeds to block 314. If the system makes a "no" determination at block 3127 before performing block 3128 at least once, then no textual snippets will be selected for inclusion in the group. In such a situation, no composite response will be able to be generated.

If, at block 3127 the system determines the measure for one of the candidate textual snippets (or other content items) satisfies one or more thresholds, the system proceeds to block 3128. At block 3128, the system selects the textual snippet (or other content items) for inclusion in a group of selected textual snippets (and/or other content items), and removes the selected textual snippet (or other content item) from the candidates to be considered in a second iteration.

The system then proceeds to block 3123 to generate new contextual feature(s) based on the selection of the textual snippet (or other content item) at block 3128. The system then performs another iteration, using the remaining candidate textual snippets (and/or other content items), until the system proceeds to block 314 after decision block 3127, or proceeds to block 3128 at decision block 3127. This process continues until the system proceeds to block 314 at decision block 3127, at which point the textual snippets (and/or other content items) for inclusion in the group have been selected at block 312.

Figure 4:
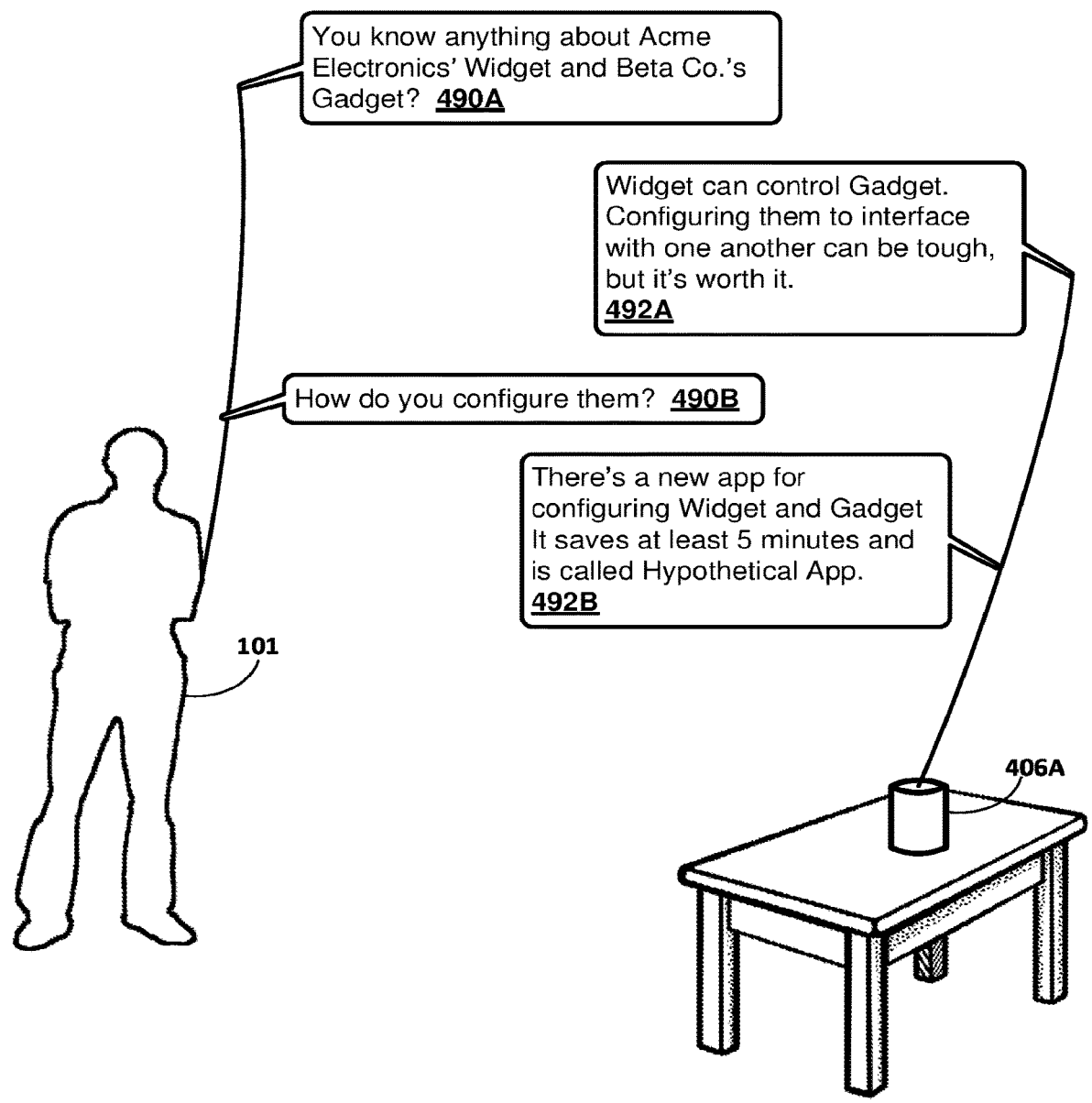
FIG. 4, FIG. 5, and FIG. 6 each depict example dialogs between a user and an automated assistant, in which composite responses can be provided.
Figure 5:
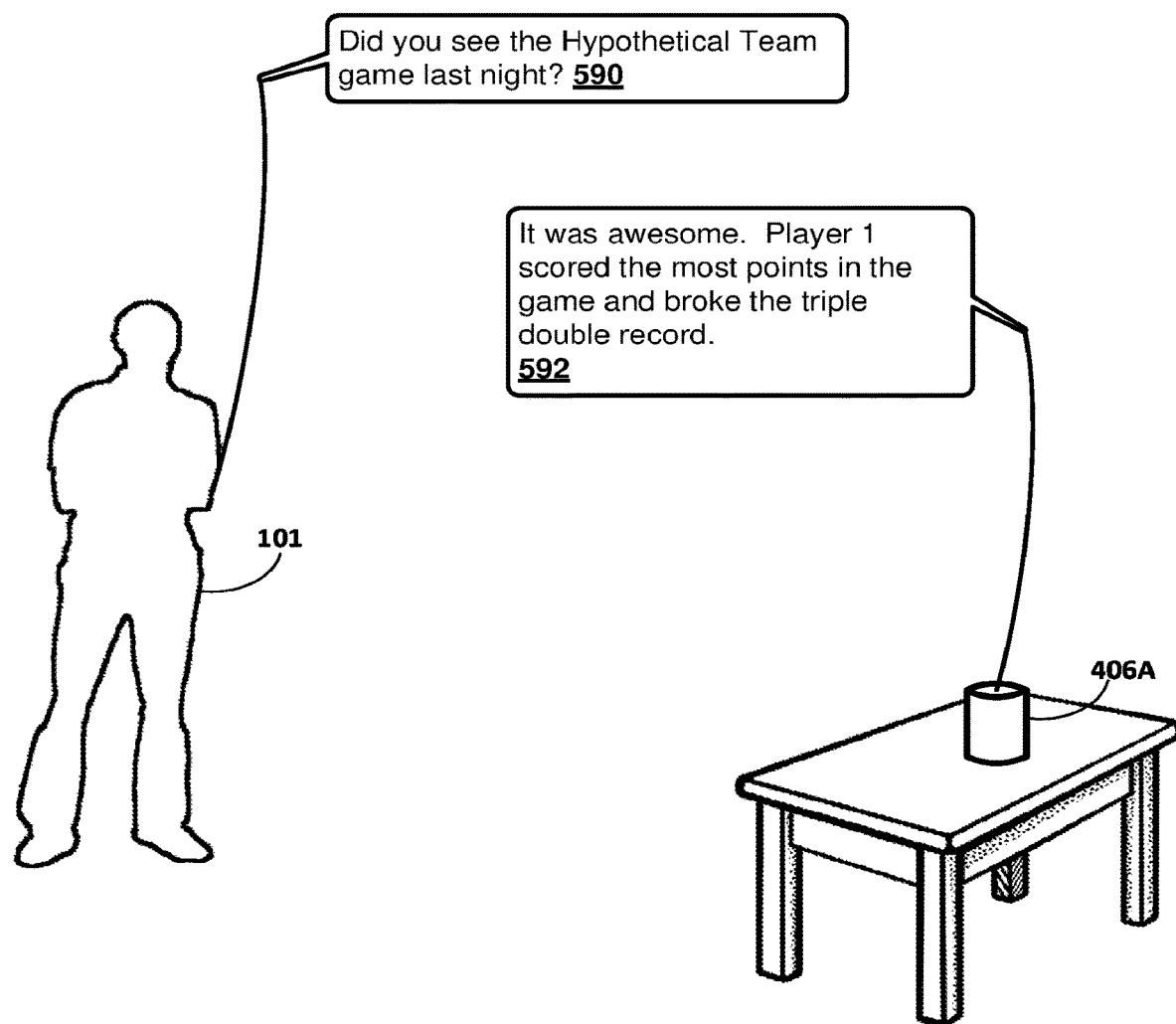
Figure 6:
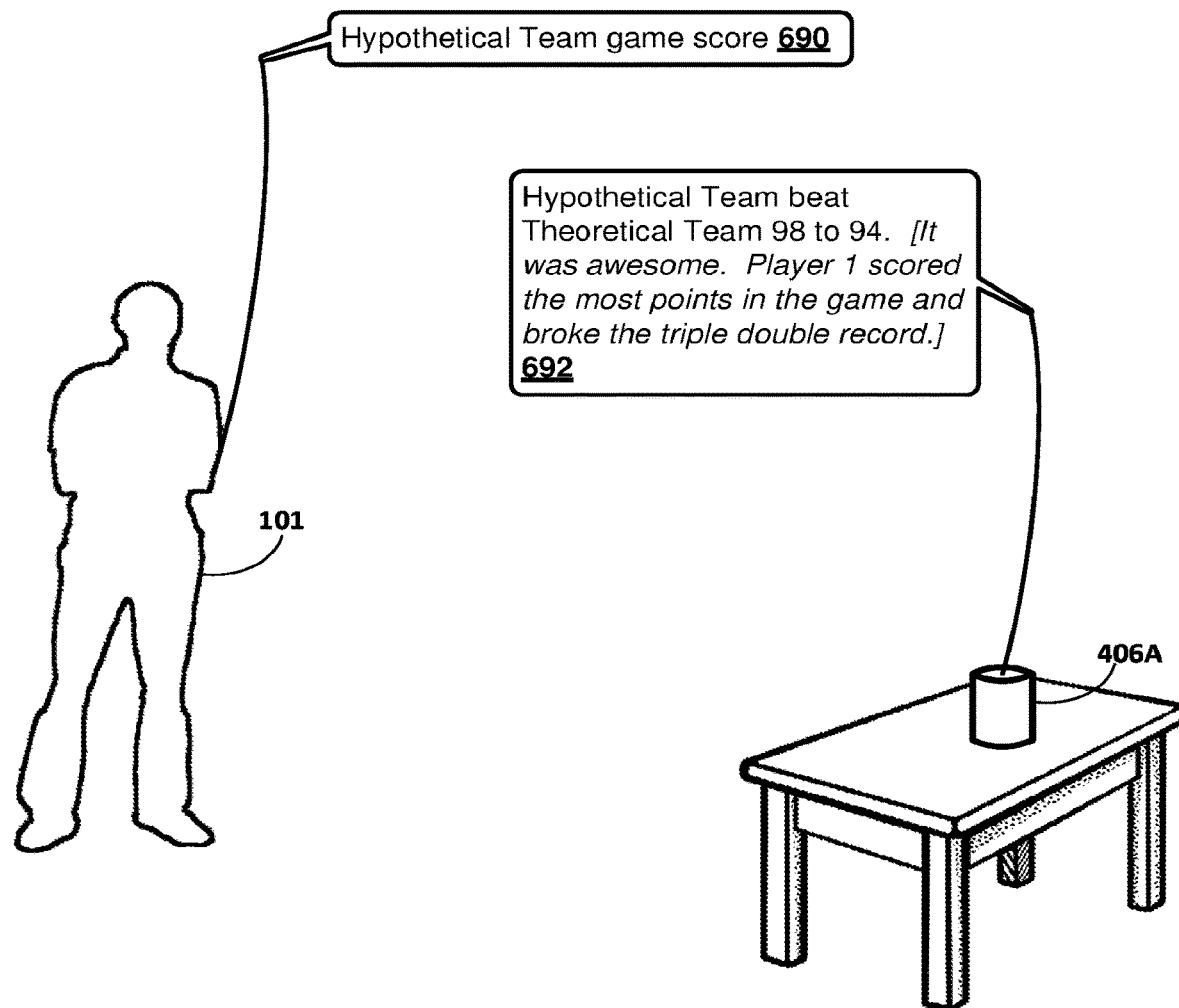

FIGS. 4, 5, and 6 each depict example dialogs between a user and an automated assistant, in which composite responses can be provided. FIGS. 4-6 illustrate examples of dialog sessions that may occur, via the microphone(s) and speaker(s), between a user 101 of a computing device 406 (depicted as a standalone interactive speaker but this is not meant to be limiting) and automated assistant according to implementations described herein. One or more aspects of automated assistant may be implemented by an automated assistant client on the computing device 406 and/or on one or more remote automated assistant components that are in network communication with the computing device 406. FIGS. 4-6 depict human-to-computer dialogs in which a user 101 engages with automated assistant using audio input/output. However, this is not meant to be limiting. For example, FIGS. 8-11 (below) depict examples in which a client device 806 is in the form of a smart phone or tablet (but that is not meant to be limiting) that includes a touchscreen 840. Similar input/output could be utilized in lieu of the audio input/output of FIGS. 4-6.

In FIG. 4, the user 101 provides first natural language input 490A of "You know anything about Acme Electronics' Widget and Beta Co.'s Gadget?" in a human-to-computer dialog session between the user 101 and the automated assistant. In response to the first natural language input 490A, automated assistant provides responsive natural language output 492A that is a composite response generated according to implementations disclosed herein. For example, the first sentence of the natural language output 492A can be based on a first textual snippet from a first content agent, and the second sentence can be based on a second textual snippet from a second content agent. The textual snippets can be generated responsive to a request that identifies the "Widget" and "Gadget" entities. Through provision of the responsive natural language output 492A the user is informed that Acme Electronics' Widget can be configured to control Beta Co.s' Gadget.

In response, the user provides second natural language input 490B of "How do you configure them", that is guided by the content of the responsive natural language output 492A. In response to the first natural language input 490A, automated assistant provides another responsive natural language output 492B that is a composite response generated according to implementations disclosed herein. For example, the first sentence of the natural language output 492B can be based on a textual snippet from a given content agent, "It saves at least 5 minutes" can be based on an additional textual snippet from another content agent, and "is called Hypothetical App." can be based on a further textual snippet from a further content agent. The textual snippets can be generated responsive to request that identifies an entity corresponding to a "Configuring Widget and Gadget" entity. Through provision of the responsive natural language output 492B, the dialog is continued and the user is provided with information for enabling the user to perform the task of configuring the electronic "Widget" to interface with "Gadget".

In FIG. 5, the user 101 provides natural language input 590 of "Did you see the Hypothetical Team game last night" in a human-to-computer dialog session between the user 101 and the automated assistant. In response to the natural language input 590, automated assistant provides responsive natural language output 592 that is a composite response generated according to implementations disclosed herein. For example, the first sentence of the natural language output 592 can be based on a first textual snippet from a first content agent, the portion of the second sentence before the "and" can be based on a second textual snippet from a second content agent, and the portion of the second sentence after the "and" can be based on a third textual snippet from a third content agent.

In FIG. 6, the user 101 provides natural language input 690 of "Hypothetical Team game score" in a human-to-computer dialog session between the user 101 and the automated assistant. In response to the natural language input 690, automated assistant provides responsive natural language output 692 that includes "Hypothetical Team Beat Theoretical Team 98 to 94", which is a direct response to the natural language input 690. In FIG. 6, the composite response of FIG. 5 is also illustrated in brackets. It is illustrated in brackets in FIG. 6 to indicate that it can also be provided, along with the direct response, in some implementations if an engagement measure described herein satisfies a threshold. Although the natural language input 690 does not directly indicate a desire of the user 101 to receive a composite or other expanded response, one may nonetheless be provided if other signal(s) cause the engagement measure to satisfy a threshold. For example, the engagement measure could satisfy the threshold if the current time of the day corresponds to a time period in which the user typically engages in prolonged dialog sessions, the device 406A is one which the user typically uses to engage in prolonged dialog sessions, minimal (or no) background noise was detected in processing of the spoken natural language input 690, etc.

Figure 7:
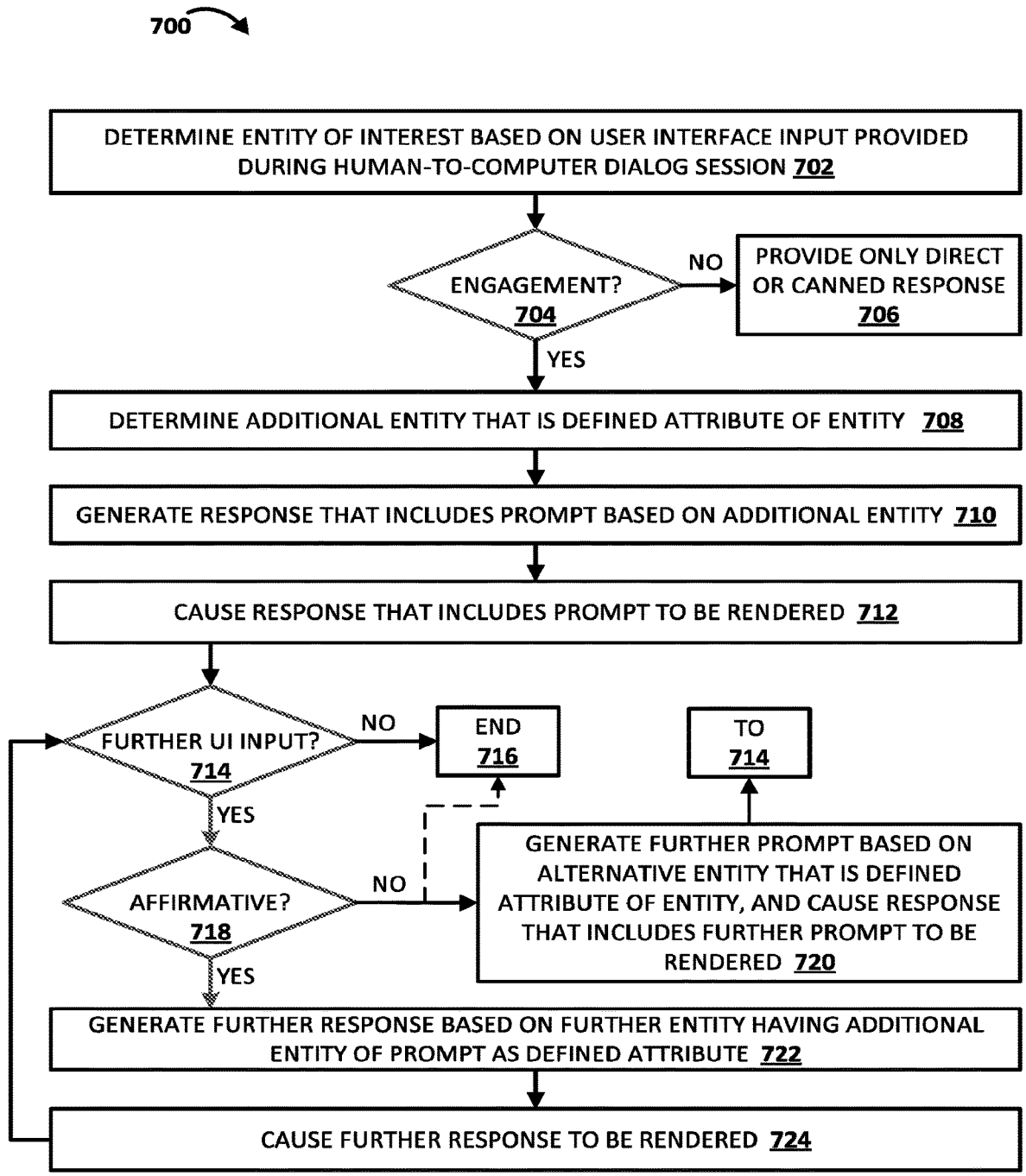
FIG. 7 depicts a flowchart illustrating an example method of guiding a human-to-computer dialog based on generating and providing expanded responses, including at least one response that includes a prompt for further engagement.

FIG. 7 depicts a flowchart illustrating an example method of guiding a human-to-computer dialog based on generating and providing expanded responses, including at least one response that includes a prompt for further engagement.

At block 702, the system determines an entity of interest based on user interface input provided during a human-to-computer dialog session. As a working example, the user interface input can be "Did you see Hypothetical Movie?". Based on such input, the system can determine an entity of interest that corresponds to the movie "Hypothetical Movie".

At block 704, the system determines whether an engagement measure satisfies a threshold. The engagement measure can be determined based on the user interface input and/or based on other signal(s). If, at block 704, the system determines the engagement measure does not satisfy a threshold, the system proceeds to block 706 and provides only a direct response or a canned response. For example, if the user interface input were instead "When was Hypothetical Movie released?", the system may determine, absent other signals, that the engagement measure is not satisfied and provide only a direct response of the year of Hypothetical Movie's release.

At block 708, the system determines an additional entity that is a defined attribute of the entity. Continuing with the working example, the system can determine an actor entity corresponding to "John Doe" (a made-up actor) based on the actor entity being connected to the entity by an "acted in" edge.

At block 710, the system generates a response that includes a prompt that is based on the additional entity. Continuing with the working example, the response can include a prompt of "Do you like other movies by John Doe" or a prompt that is a "suggestion chip" of "Chat about John Doe" or "More about John Doe".

In some implementations, at block 710 the system further includes, in the response, an acknowledgment of the user interface input of block 702 and/or a pertinent fact about the entity of interest of block 702. Continuing with the working example, the acknowledgment can be "Hypothetical Movie was great" and the pertinent fact can be "Did you know that this is the only comedy acted in by John Doe". In some implementations, a fact can be automatically determined for an entity based on two or more attributes for the entity such as the attributes of "John Doe" for an "acted in" edge and "comedy" for a "collection" edge. This automatically determined fact can be flagged as pertinent based on the attributes: each, individually, occurring relatively frequently as attributes among a corpus of entities of the same class; and/or co-occurring relatively infrequently as attributes among the corpus of entities of the same class.

In some implementations, at block 710 the system generates a response based on a template, such as a template that is specific to a class of the entity of interest. The template can include variables, and generating the response can be based on determining values, that are specific to the at least one entity of interest, for the variables of the stored template. One of the variables of the template can correspond to the additional entity determined at block 708 and can include fixed text that prompts the user. In some implementations, the stored template defines a tree structure with the variables of the stored template each defining a sub-tree of the tree structure, and each sub-tree including a plurality of sub-templates each having at least one sub-variable. In those implementations, the sub-trees are interrelated, and generating the response based on determining values for the variables includes performing a depth-first traversal of the tree structure to determine the values. Performing the depth-first traversal of the tree structure can be more efficient for processor(s), performing the traversal, than performing an exhaustive traversal and/or other traversals.

At block 712, the system causes the prompt to be rendered at the client device as part of a response, by the automated assistant, to the user interface input of block 702. As described herein, the system can cause the prompt to be rendered audibly and/or visually. The prompt can be an overt prompt to the user, or a more subtle "suggestion chip". In various implementations, a format for providing the prompt can be based at least in part on an engagement measure determined as described herein.

At block 714, the system monitors for further user interface input of the user after the prompt is rendered. If none is received within a threshold amount of time, the system can proceed to block 716 wherein method 700 ends for the current dialog session.

If further user interface input is received at block 714, the system proceeds to block 718 and determines if the user interface input is affirmative user interface input. If so, the system proceeds to block 722 and generates a further response that is based on a further entity having the additional entity of the prompt (and of block 708) as a defined attribute. Continuing with the working example, if the prompt is "Do you like other movies by John Doe" and affirmative user interface input is received (e.g., a spoken "yes", a selection of a graphical element), a further response can be generated based on an additional movie that includes John Doe as an actor. In some implementations, the additional movie can be selected, from a plurality of candidate movies with John Doe as an actor, based on the additional movie having more attributes in common with the entity of block 702 ("Hypothetical Movie") than other of the candidate movies (e.g., directed by, filming location(s), other actor(s), etc.). The response can be generated, for example, using one or more of the techniques described above with respect to block 710, and can optionally include a prompt generated based on the further entity. In some implementations, the response can additionally or alternatively be a composite response generated, for example, based on the method 300 of FIG. 3A, and using the further entity to generate requests provided to content agents.

At block 724, the system causes the further response to be rendered at the client device as a response, by the automated assistant, to the further UI input of block 714. The system then proceeds back to block 714.

If, at an initial or subsequent iteration of block 718, it is determined that affirmative UI input is not received, the system proceeds to block 716 or block 720. The system can proceed to block 716 (end) if, for example, the further UI input indicates a desire to cease providing of expanded responses. In some implementations, the system can proceed to block 716, then start another iteration of method 700, if the further UI input indicates a substantial topic shift (e.g., to an unrelated entity). The system can proceed to block 720, for example, if the further UI input is a negative response indicating negative sentiment toward the prompt rendered as a result of block 712.

At block 720, the system generates a further prompt based on an alternative entity that is a defined attribute of the entity (of block 702), but is different than the additional entity determined at block 708. The system can utilize one or more techniques described above with respect to block 710 in generating such a further prompt. The system then proceeds to block 714.

Although not explicitly illustrated in FIG. 7, in various implementations the system can update attributes associated with a user in response to various user interface inputs of the user that are provided in response to prompts.

FIGS. 8, 9, 10, and 11 each depict example dialogs between a user (unillustrated) and an automated assistant, in which response(s) that include prompts for further engagement can be provided. In FIGS. 8-11, client device 806 is in the form of a smart phone or tablet (but that is not meant to be limiting) and includes a touchscreen 840. Rendered visually on touchscreen 840 in each of FIGS. 8-11 is a corresponding transcript of a human-to-computer dialog between a user ("You" in FIGS. 8-11) of client device 806 and an instance of automated assistant executing (at least in part) on client device 806. Also provided is an input field 844 in which the user is able to provide natural language content, as well as other types of inputs such as images, sound, etc.

Figure 8:
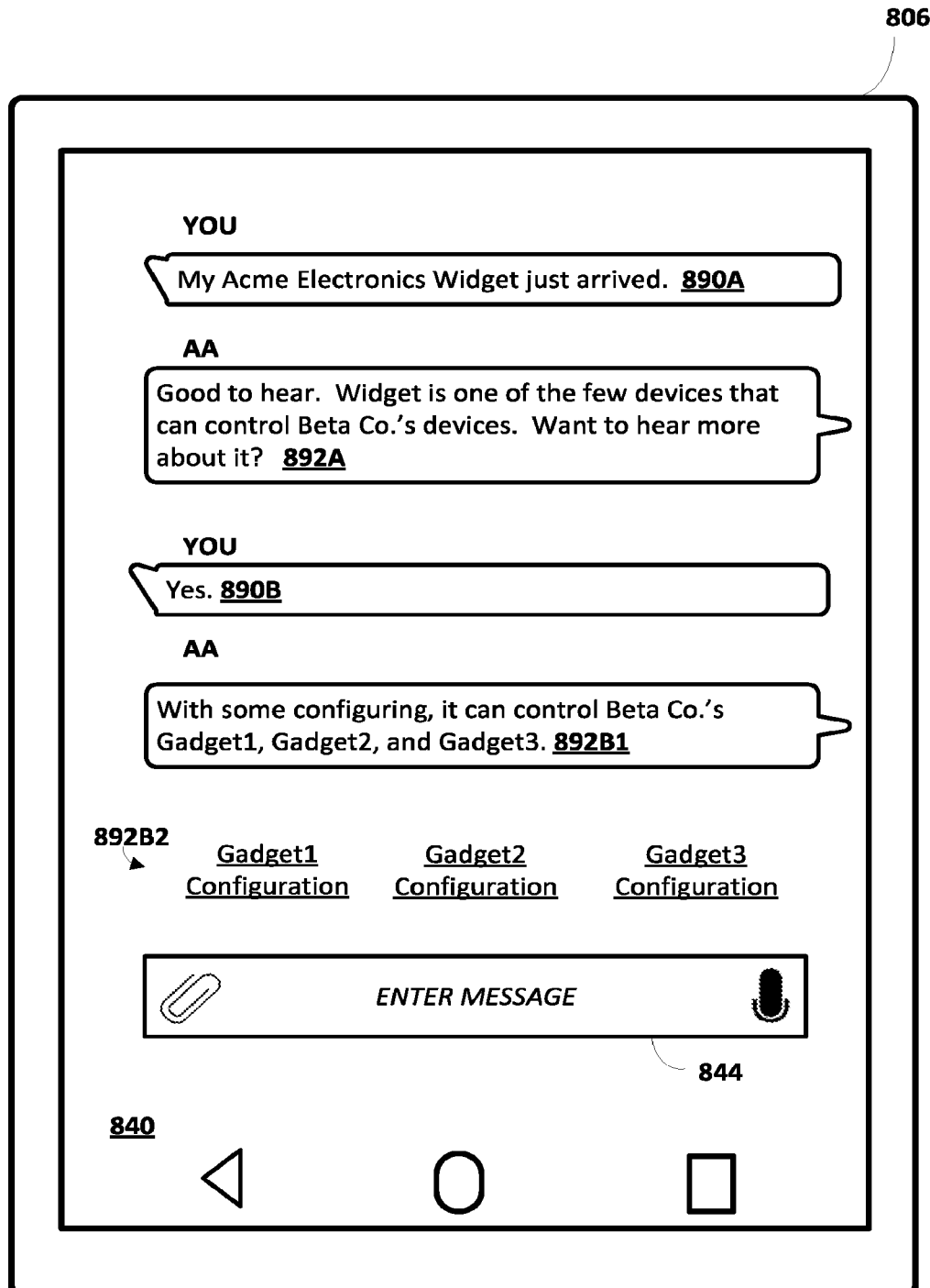

In FIG. 8, the user provides input 890A through interaction with the input field 844 The input 890A and other inputs in FIGS. 8-11 can be provided by the user typing using a virtual keyboard rendered in response to interaction with input field 844 and/or by providing voice input (e.g., after tapping the microphone of input field 844 or speaking a hot word) that is converted to text.

The automated assistant can determine an entity of interest that corresponds to "Electronics Widget" based on input 890A, and utilize the entity of interest to generate response 892A. The response 892A includes an acknowledgement ("Good to hear"), a pertinent fact ("Widget is one of the few devices that can control Beta Co.'s devices"), and a prompt ("Want to hear more about it?"). In some implementations, the pertinent fact is determined based on the "Electronics Widget" entity having a relationship (e.g., "controls") to the "Beta Co. devices" entity that is relatively infrequent in a knowledge graph or other entity database. In some implementations, the response 892A can be generated based on a template as described herein.

The user then provides affirmative input 890B responsive to the response 892A. Based on the input 890B being affirmative input, the automated assistant can generate a further response that includes portion 892B1 and portion 892B2. Portion 892B1 is rendered visually above portion 892B2 and can also optionally be audibly rendered (whereas portions 892B2 are not). Portion 892B1 describes the entities corresponding to Beta Co.'s "Gadget1, Gadget2, and Gadget3". The automated assistant can select those entities based on those entities having a defined relationship, in a knowledge graph, to the "Beta Co.'s devices" entity and the "Acme Electronics Widget" entity having a "controls" relationship with those entities.

The portion 892B2 includes three selectable suggestions any one of which can be selected to cause further content to be rendered that guides the user through configuring "Acme Electronics Widget" to control the respective "Gadget" of Beta Co. The automated assistant can identify the content linked to by each of the selectable suggestions, for example, based on the content being defined in the knowledge graph in association with the "controls" relationship between the "Acme Electronics Widget" entity and the corresponding "Gadget" entity.

Figure 9:
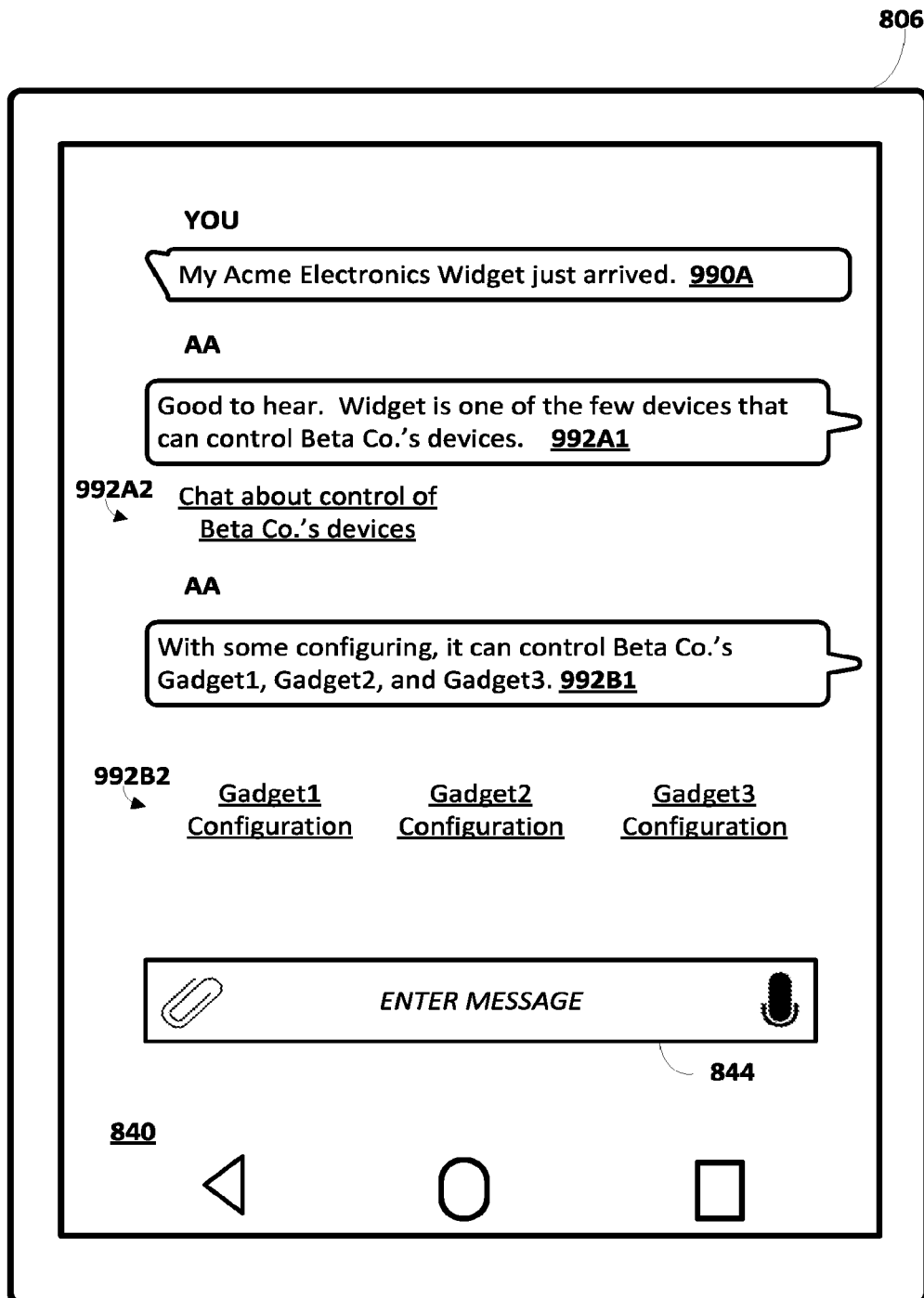

In FIG. 9, the user provides input 990A, which is the same as input 890A of FIG. 8. However, instead of response 892A of FIG. 8, the automated assistant provides a response that includes portions 992A1 and 992A2. Portion 992A 1 includes the same content as response 892A of FIG. 8, except for the prompt ("Want to hear more about it?"). Instead, the prompt is provided in portion 992A2 as a selectable suggestion of "Chat about control of Beta Co.'s devices". In some implementations, different responses can be provided in FIGS. 8 and 9 based on different engagement measures being determined in FIGS. 8 and 9. For example, an engagement measure less indicative of engagement can be determined in FIG. 9 based on time of day, user intonation in voice input, and/or other factors.

The user then provides affirmative input by selecting the suggestion in portion 992A2. Based on the affirmative input, the automated assistant can generate a further response that includes portion 992B1 and portion 992132, which are the same as portions 892B1 and 892B2 of FIG. 8.

Figure 10:
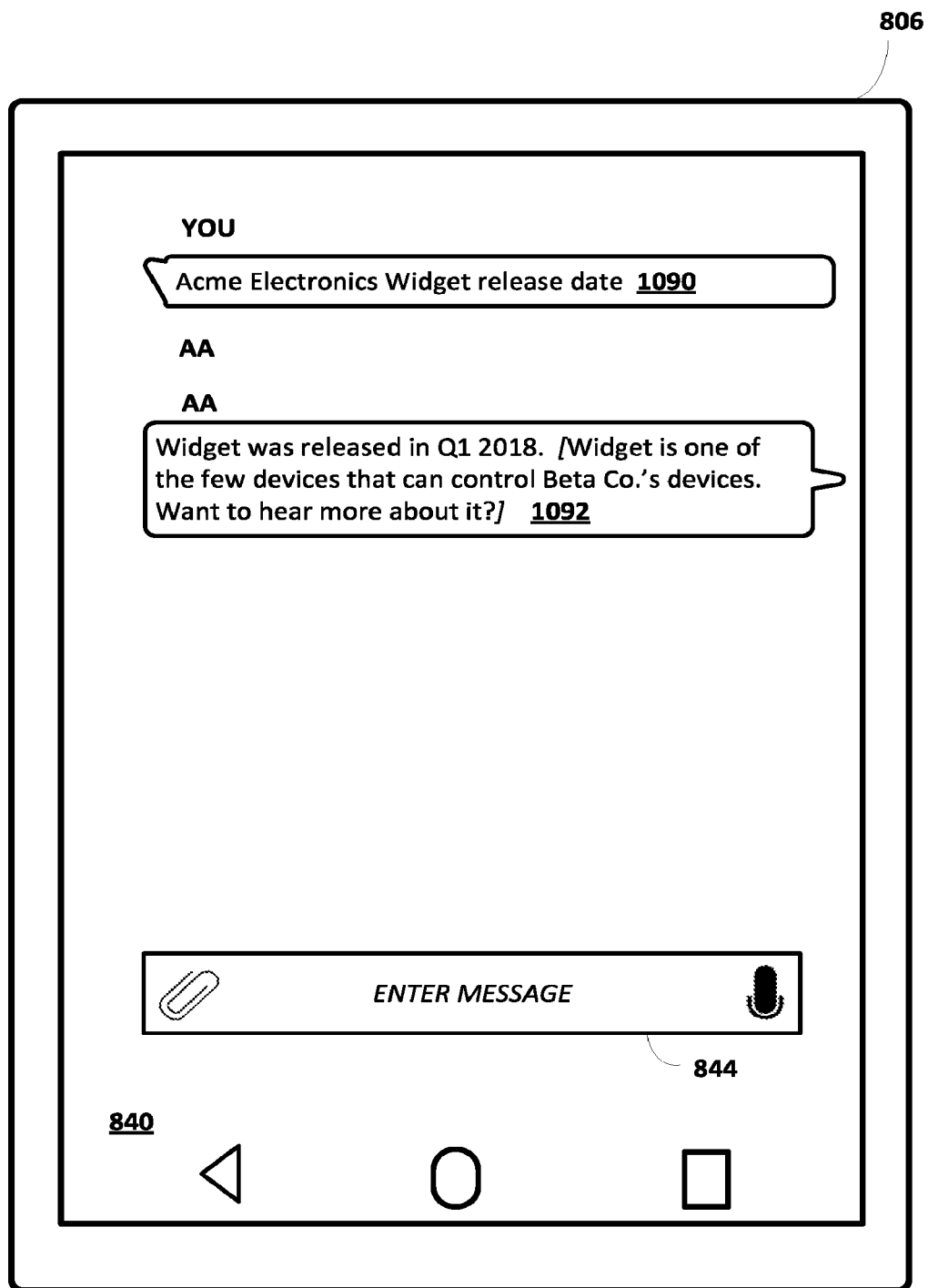

In FIG. 10, the user provides input 1090, which specifically requests the release data of the Acme Electronics widget. As a result, it can be interpreted by a dialog state tracker and/or other component of automated assistant as eliciting a direct response that includes the release date. Accordingly, the automated assistant provides a response 1092 that includes the direct response of "Widget was released in Q1 2018". In FIG. 10, the pertinent fact and prompt of FIG. 8 are also illustrated in brackets. They are illustrated in brackets in FIG. 10 to indicate that they can also be provided, along with the direct response, in some implementations if an engagement measure described herein satisfies a threshold. Although the input 1090 does not directly indicate a desire of the user to receive an expanded response, one may nonetheless be provided if other signal(s) cause the engagement measure to satisfy a threshold.

Figure 11:
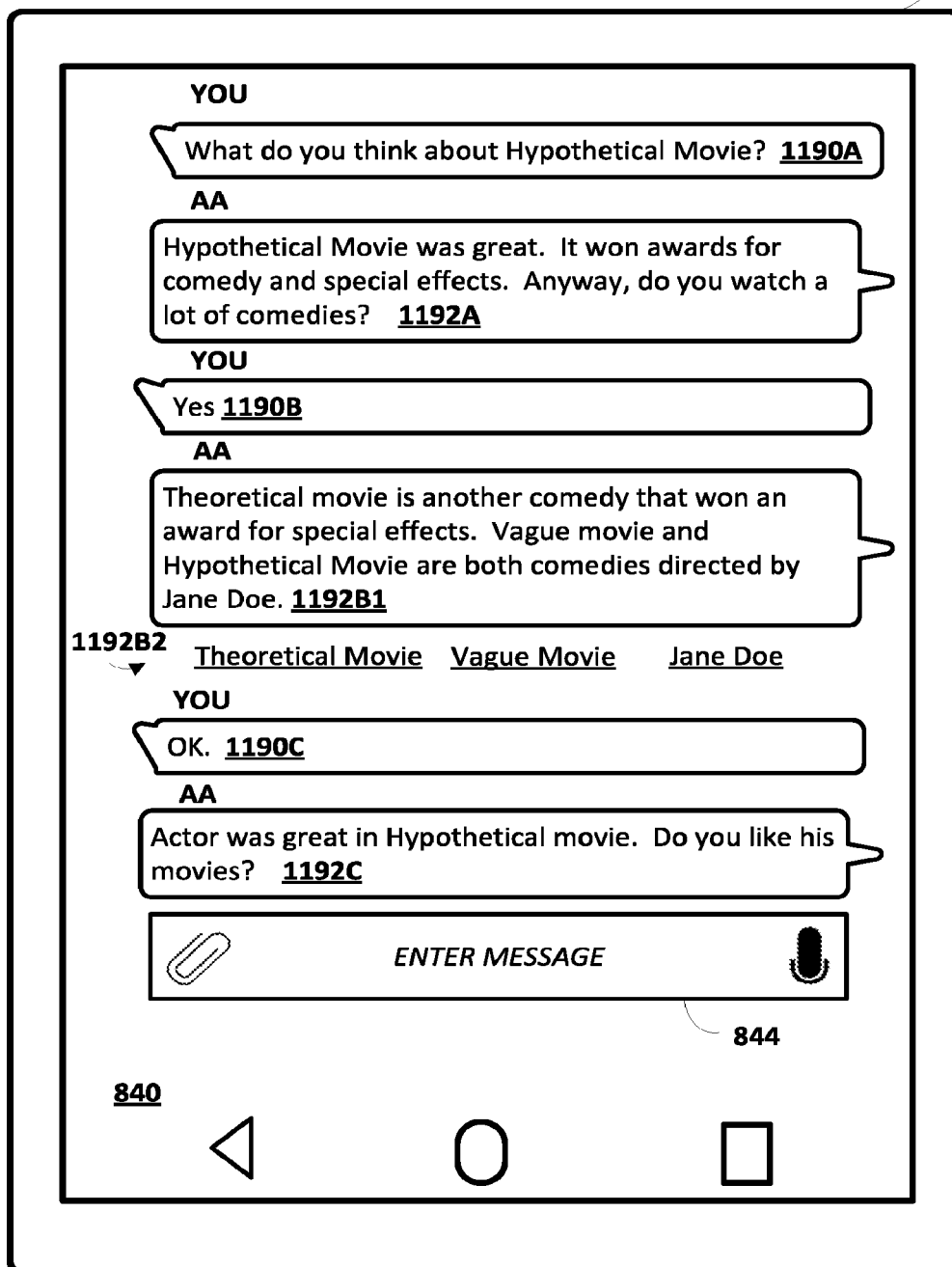

In FIG. 11, the user provides input 1190A. The automated assistant can determine an entity of interest that corresponds to "Hypothetical Movie" based on input 1190A, and utilize the entity of interest to generate response 1192A. The response 1192A includes an acknowledgement ("Hypothetical Movie was great"), a pertinent fact ("It won awards for comedy and special effects"), and a prompt ("Any way, do you watch a lot of comedies?"). In some implementations, the pertinent fact is determined based on the "Hypothetical Movie" entity having an "awards" relationship with both a "comedy" and "special effects" entity—and those entities (and optionally their "awards" relationship) being relatively frequent, individually, as defined attributes of "movie" entities, but those entities (and their "awards" relationship) relatively infrequent, collectively, as defined attributes of "movie" entities. The "comedy" entity of the prompt can be selected based on being an attribute of the "Hypothetical Movies" entity. In some implementations, the response 1192A can be generated based on a template as described herein.

The user then provides affirmative input 1190B responsive to the response 1192A. Based on the input 1190B being affirmative input, the automated assistant can generate a further response that includes portion 1192B1 and portion 1192B2. Portion 1192B1 describes further movies that have the "comedy" attribute of the prompt of response 1192A, and that also share other attributes in common with "Hypothetical Movie". The portion 1192B2 includes three selectable suggestions, each of which is a prompt related to a corresponding one of the three entities mentioned in portion 1192B1. Any of the selectable suggestions can be selected to cause further content to be rendered about the respective entity. As one non-limiting example, "Theoretical Movie" can be selected to cause the automated assistant to connect the client device to a server for streaming "Theoretical Movie". As another non-limiting example, "Jane Doe" can be selected to cause a further response to be generated, that is specific to Jane Doe, and displayed in the transcript.

The user then provides input 1190C that is not affirmative. In response, the automated assistant pivots from the comedy entity, to another entity that is an attribute of Hypothetical Movie. Namely, based on the input 1190C not being affirmative, the automated assistant selects an alternative entity of "Actor" that has an "acted in" relationship to "Hypothetical Movie". The automated assistant then generates response 1192C based on the "Actor" entity.

Figure 12:
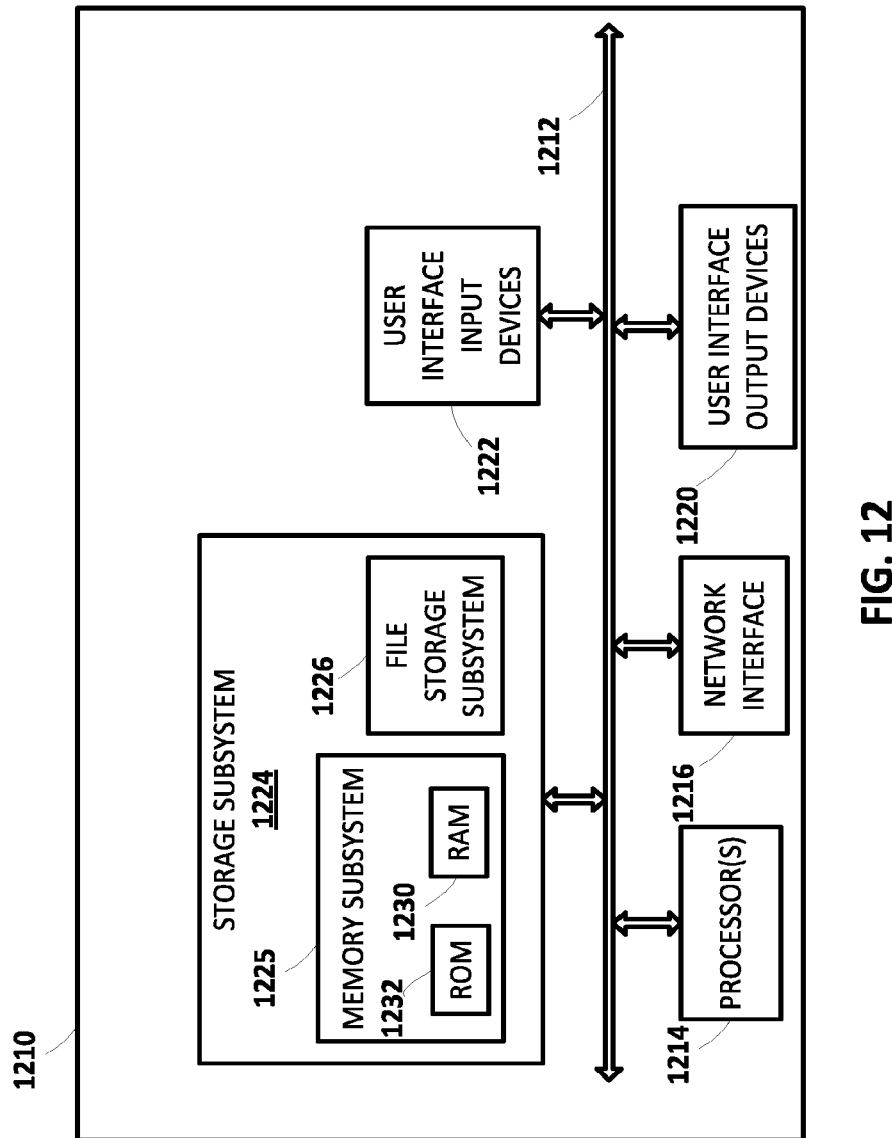
FIG. 12 illustrates an example architecture of a computing device.

FIG. 12 is a block diagram of an example computing device 1210 that may optionally be utilized to perform one or more aspects of techniques described herein. In some implementations, one or more of a client computing device, automated assistant 120, and/or other component(s) may comprise one or more components of the example computing device 1210.

Computing device 1210 typically includes at least one processor 1214 which communicates with a number of peripheral devices via bus subsystem 1212. These peripheral devices may include a storage subsystem 1224, including, for example, a memory subsystem 1225 and a file storage subsystem 1226, user interface output devices 1220, user interface input devices 1222, and a network interface subsystem 1216. The input and output devices allow user interaction with computing device 1210. Network interface subsystem 1216 provides an interface to outside networks and is coupled to corresponding interface devices in other computing devices.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1210 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1210 to the user or to another machine or computing device.

Storage subsystem 1224 stores programming and data constructs that provide the functionality of some or all of the modules described herein. For example, the storage subsystem 1224 may include the logic to perform selected aspects of the method(s) of FIGS. 3A/3B and/or 9, as well as to implement various components depicted in FIG. 1.

These software modules are generally executed by processor 1214 alone or in combination with other processors. Memory 1225 used in the storage subsystem 1224 can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1226 in the storage subsystem 1224, or in other machines accessible by the processor(s) 1214.

Bus subsystem 1212 provides a mechanism for letting the various components and subsystems of computing device 1210 communicate with each other as intended. Although bus subsystem 1212 is shown schematically as a single bus, alternative implementations of the bus subsystem may use multiple busses.

Computing device 1210 can be of varying types including a workstation, server, computing cluster, blade server, server farm, or any other data processing system or computing device. Due to the ever-changing nature of computers and networks, the description of computing device 1210 depicted in FIG. 12 is intended only as a specific example for purposes of illustrating some implementations. Many other configurations of computing device 1210 are possible having more or fewer components than the computing device depicted in FIG. 12.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method performed by processor(s) is provided that includes determining at least one entity of interest and transmitting, to each of a plurality of disparate content agents, a corresponding request that identifies the at least one entity of interest. Determining the at least one entity of interest is based on user interface input of a user, where the user interface input is provided via a client device during a human-to-computer dialog session that is facilitated by the client device and that is between the user and an automated assistant. The method further includes receiving, from each of the disparate content agents, at least one corresponding textual snippet that is responsive to the corresponding request. The method further includes processing the corresponding textual snippets, using a trained machine learning model, to determine a subgroup of the corresponding textual snippets. The subgroup of the corresponding textual snippets include: a first textual snippet from a first content agent of the disparate content agents, and a second textual snippet from a second content agent of the disparate content agents. The subgroup of the corresponding textual snippets exclude: a third textual snippet that is from the first content agent, the second content agent, or a third content agent of the disparate content agents. The method further includes combining the corresponding textual snippets of the subgroup into a composite response. The method further includes causing the client device to render the composite response as a response, from the automated assistant, that is responsive to the user interface input provided during the human-to-computer dialog session.

These and other implementations of the technology disclosed herein can include one or more of the following features.

In some implementations, processing the corresponding textual snippets, using the trained machine learning model, to determine the subgroup of the corresponding textual snippets includes, during a first iteration: processing at least the first textual snippet and the second textual snippet using the trained machine learning model; and selecting, based on the processing during the first iteration, the first textual snippet for inclusion in the subgroup. The first textual snippet is selected for inclusion during the first iteration in lieu of the second textual snippet and in lieu of any additional textual snippet processed during the first iteration. In some of those implementations, processing the corresponding textual snippets, using the trained machine learning model, to determine the subgroup of the corresponding textual snippets further includes, during a second iteration that immediately follows the first iteration: processing at least the second textual snippet using the trained machine learning model; and selecting, based on the processing during the second iteration, the second textual snippet for inclusion in the subgroup. The second textual snippet is selected for inclusion during the second iteration in lieu of any additional textual snippet processed during the second iteration. In some versions of those implementations, the third textual snippet is processed, using the trained machine learning model, during one or both of: the first iteration and the second iteration. In some additional or alternative versions of those implementations, processing the corresponding textual snippets, using the trained machine learning model, to determine the subgroup of the corresponding textual snippets further includes, during a subsequent iteration that is subsequent to the first iteration and that is subsequent to the second iteration: processing at least the third textual snippet using the trained machine learning model; and determining, based on the processing during the subsequent iteration, to not include, in the subgroup, the third textual snippet or any additional textual snippet processed during the subsequent iteration.

In some implementations, the trained machine learning model is a neural network model trained based on supervised training examples.

In some implementations, the trained machine learning model is a deep neural network model representing a trained policy, and the deep neural network model is trained based on rewards that are determined, during reinforcement learning, based on a reward function. In some versions of those implementations, the reinforcement learning is based on prior human-to-computer dialog sessions of prior users, and the rewards are determined based on implicit or explicit reactions of the prior users to prior composite responses. The prior composite responses include prior textual snippets selected using the deep neural network model, and the prior composite responses were rendered during the prior human-to-computer dialog sessions.

In some implementations, combining the corresponding textual snippets of the subgroup into the composite response includes: including content of the first textual snippet in an initial portion of the composite response based on the first textual snippet being selected during the first iteration; and including content of the second textual snippet in a next portion of the composite response, that immediately follows the initial portion, based on the second textual snippet being selected during the second iteration.

In some implementations, combining the corresponding textual snippets of the subgroup into the composite response includes: applying tokens of the textual snippets of the subgroup as input to a trained generative model that is a sequence-to-sequence model; and generating the composite response over the trained generative model based on the input. The composite response can differ from the textual snippets of the subgroup and generating the composite response can include producing the composite response based on learned parameters of the trained generative model.

In some implementations, the method further includes: determining, based at least in part on the user interface input, an engagement measure that indicates desirability of providing the composite response in lieu of a more condensed response; and determining that the engagement measure satisfies a threshold. In some of those implementations, transmitting the corresponding request to each of the plurality of disparate content agents is responsive to determining that the engagement measure satisfies the threshold. In some implementations where an engagement measure is determined, determining the engagement measure is further based on one or multiple of: a type of the client device, past interactions of the user via the client device, a time of day, a day of the week, a type of background noise, and a noise level of the background noise. In some implementations where an engagement measure is determined, the user interface input is voice input and wherein determining the engagement measure is further based on one or more voice characteristics of the voice input.

In some implementations, a quantity of the textual snippets determined for inclusion in the subgroup is further based on one or multiple of: a type of the client device, past interactions of the user via the client device, a time of day, a day of the week, a type of background noise, and a noise level of the background noise. In some versions of those implementations, the method further includes processing, using the trained machine learning model and along with the corresponding textual snippets, the one or multiple of: the type of the client device, the past interactions of the user via the client device, the time of day, the day of the week, the type of the background noise, and the noise level of the background noise. In those versions, the processing, using the machine learning model, of the one or multiple of: the type of the client device, the past interactions of the user via the client device, the time of day, the day of the week, the type of the background noise, and the noise level of the background noise, influences the quantity of the textual snippets determined for inclusion in the subgroup.

In some implementations, a method performed by processor(s) is provided that includes determining at least one entity of interest based on user interface input of a user that is provided via a client device during a human-to-computer dialog session that is facilitated via the client device and that is between the user and an automated assistant. The method further includes determining, based at least in part on the user interface input, an engagement measure that indicates desirability of providing a response that includes a prompt for further engagement of the user in lieu of a response that does not include any prompt for further engagement of the user. The method further includes determining that the engagement measure satisfies a threshold and, in response to determining that the engagement measure satisfies the threshold: generating the response that includes the prompt for further engagement. Generating the response that includes the prompt for further engagement includes: determining an additional entity based on the additional entity being a defined attribute for the at least one entity of interest, and generating the prompt for further engagement based on the additional entity. The method further includes causing the client device to render the response that includes the prompt for further engagement. The response is rendered as a response, from the automated assistant, that is responsive to the user interface input provided during the human-to-computer dialog session. The method further includes receiving an affirmative user interface input in response to the prompt being rendered, and in response to receiving the affirmative user interface input: generating a further response that is based on a further entity. Generating the further response based on the further entity is based on the further entity having a defined relationship to the additional entity of the prompt. The method further includes causing the client device to render, during the human-to-computer dialog session, the further response as a further response from the automated assistant.

These and other implementations of the technology can include one or more of the following features.

In some implementations, the user interface input is voice input, and determining the at least one entity of interest includes: performing voice-to-text processing of audio data capturing the voice input, and determining the at least one entity of interest based on text generated by performing the voice-to-text processing. In some of those implementations, determining the engagement measure is based on one or multiple of: pitch, intonation, and tone of the voice input, as determined based on further processing of the audio data. In some of those implementations, determining the engagement measure is based on one or both of: a type of background noise in the audio data and a noise level of the background noise in the audio data, as determined based on further processing of the audio data.

In some implementations, determining the engagement measure is based on one or multiple of: a type of the client device, past interactions of the user via the client device, a time of day, and a day of the week.

In some implementations, determining the engagement measure is based on one or both of: whether the client device is rendering content when the user interface input is received, and one or more properties of any content rendered when the user interface input is received.

In some implementations, the prompt is rendered as audible output and the affirmative user interface input is a further voice input.

In some implementations, the prompt is rendered visually as a selectable graphical element in combination with additional content of the response that is rendered audibly and/or rendered visually, and the affirmative user interface input is a touch selection of the selectable graphical element.

In some implementations, generating the response that includes the prompt for further engagement includes: identifying a stored template, that includes a plurality of variables, based on the stored template being assigned to a class of the at least one entity; and generating the response based on determining values, that are specific to the at least one entity of interest, for the variables of the stored template. In some versions of those implementations, the stored template defines a tree structure with the variables of the stored template each defining a sub-tree of the tree structure, and each of the sub-trees includes a plurality of sub-templates each having at least one sub-variable. In those versions, the sub-trees are interrelated, and generating the response based on determining values for the variables includes performing a depth-first traversal of the tree structure to determine the values.

In some implementations, generating the prompt for further engagement is further based on a second additional entity, and generating the response that includes the prompt for further engagement further includes: determining the second additional entity based on the second additional entity being a defined attribute for the at least one entity of interest; and selecting both the additional entity and the second additional entity based on: the additional entity and the second additional entity each, individually, occurring relatively frequently among a corpus; and co-occurrence of the additional entity and the second additional entity being relatively infrequent among the corpus.

In some implementations, a method performed by processor(s) is provided that includes determining at least one entity of interest. Determining the at least one entity of interest is based on user interface input, of a user, that is provided via a client device during a human-to-computer dialog session that is facilitated by the client device and that is between the user and an automated assistant. The method further includes transmitting, to each of a plurality of disparate content agents, a corresponding request that identifies the at least one entity of interest. The method further includes receiving, from each of the disparate content agents, at least one corresponding content item that is responsive to the corresponding request. The method further includes processing the corresponding content items, using a trained machine learning model, to determine a subgroup of the corresponding content items. The subgroup of the corresponding content items include: a first content item from a first content agent of the disparate content agents, and a second first content item from a second content agent of the disparate content agents. The subgroup of the corresponding content items exclude: a third content item, the third content item being from the first content agent, the second content agent, or a third content agent of the disparate content agents. The method further includes: combining the corresponding content items of the subgroup into a composite response; and causing the client device to render the composite response as a response, from the automated assistant, that is responsive to the user interface input provided during the human-to-computer dialog session.

These and other implementations of the technology can include one or more of the following features.

The corresponding content items received from the plurality of disparate agents can include one or more textual snippets, one or more images, one or more video segments, and/or one or more emojis.

In some implementations, processing the corresponding content items, using the trained machine learning model, to determine the subgroup of the corresponding content items comprises, during a first iteration: processing at least the first content item and the second content item using the trained machine learning model, and selecting, based on the processing during the first iteration, the first content item for inclusion in the subgroup. The first content item is selected for inclusion during the first iteration in lieu of the second content item and in lieu of any additional content item processed during the first iteration. In some of those implementations, processing the corresponding content items, using the trained machine learning model, to determine the subgroup of the corresponding content items further includes, during a second iteration that immediately follows the first iteration: processing at least the second content item using the (rained machine learning model, and selecting, based on the processing during the second iteration, the second content item for inclusion in the subgroup, the second content item selected for inclusion during the second iteration in lieu of any additional content item processed during the second iteration. In some versions of those implementations, the third content item is processed, using the trained machine learning model, during one or both of: the first iteration and the second iteration. In some additional or alternative implementations, processing the corresponding content items, using the trained machine learning model, to determine the subgroup of the corresponding content items further includes, during a subsequent iteration that is subsequent to the first iteration and that is subsequent to the second iteration: processing at least the third content item using the trained machine learning model; and determining, based on the processing during the subsequent iteration, to not include, in the subgroup, the third content item or any additional content item processed during the subsequent iteration.

In some implementations, the trained machine learning model is a neural network model trained based on supervised training examples.

In some implementations, the trained machine learning model is a deep neural network model representing a trained policy, and the deep neural network model is trained based on rewards that are determined, during reinforcement learning, based on a reward function.

In some implementations, the method further includes: determining, based at least in part on the user interface input, an engagement measure that indicates desirability of providing the composite response in lieu of a more condensed response; and determining that the engagement measure satisfies a threshold. In some of those implementations, transmitting the corresponding request to each of the plurality of disparate content agents is responsive to determining that the engagement measure satisfies the threshold.

In some implementations, determining the engagement measure is further based on one or multiple of: a type of the client device, past interactions of the user via the client device, a time of day, a day of the week, a type of background noise, and a noise level of the background noise.

In some implementations, a quantity of the content items determined for inclusion in the subgroup is based on one or multiple of: a type of the client device, past interactions of the user via the client device, a time of day, a day of the week, a type of background noise, and a noise level of the background noise.

What is claimed is:

1. A method implemented by one or more processors, the method comprising:
   receiving a free-form natural language input, the free-form natural language input being generated based on user interface input from a user at a client device;
   in response to receiving the free-form natural language input:
     selecting, based on the free-form natural language input and from a corpus of content agents, a subset of the content agents, wherein the subset includes a first content agent and a second content agent that is disparate from the first content agent;
   in response to selecting the subset of the content agents:
     transmitting a corresponding request to each of the content agents of the subset, including:
       transmitting a first request to the first content agent, and
       transmitting, to the second content agent, a second request that is disparate from the first request;
     receiving, from each of the content agents of the subset in response to transmitting the corresponding requests, corresponding responsive content, including:
       receiving first responsive text from the first content agent in response to transmitting the first request, and
       receiving second responsive text from the second content agent in response to transmitting the second request;
     generating a composite response, generating the composite response comprising:
       applying two or more of the corresponding responsive contents to a trained generative model, that is a sequence-to-sequence model, to generate a resulting decoding that indicates the composite response, and
       determining, based on the resulting decoding, the composite response,
         wherein the two or more of the corresponding responsive contents, that are applied to the trained generative model in generating the composite response, include the first responsive text and the second responsive text, and
         wherein the composite response is shortened relative to the two or more responsive contents applied to the trained generative model; and
     causing the client device to render the composite response as responsive to the user interface input from the user.

2. The method of claim 1, wherein the second request has a second format that is disparate from a first format of the first request.

3. The method of claim 2, wherein the second request has second content that is disparate from first content of the first request.

4. The method of claim 1, wherein the two or more of the corresponding responsive contents, applied to the trained generative model in generating the composite response, is a subset of the corresponding responsive contents, and further comprising:
   selecting the subset of the corresponding responsive contents.

5. The method of claim 4, wherein selecting the subset of the corresponding responsive contents comprises performing deduping, of the corresponding responsive contents, to remove one or more of the corresponding responsive contents from the subset.

6. The method of claim 4, wherein selecting the subset of the corresponding responsive contents comprises:
   generating, for each of the corresponding responsive contents, a corresponding measure; and
   selecting the subset of the corresponding responsive contents using the corresponding measures.

7. The method of claim 6, further comprising:
   generating the corresponding measure, for the first responsive text, based on processing the first responsive text using a trained selection model.

8. The method of claim 1, wherein the two or more responsive contents are applied, on a token-by-token basis, to the trained generative model in generating the composite response.

9. The method of claim 1, wherein the user interface input is voice input.

10. The method of claim 1, wherein causing the client device to render the composite response as responsive to the user interface input from the user comprises:
    providing, by a remote component that is remote from the client device but in communication with the client device via a wide area network, the composite response;
    wherein the client device renders the composite response based on the composite response being provided by the remote component.

11. A system, comprising:
    memory storing instructions;
    one or more processors operable to execute the instructions to:

receive a free-form natural language input, the free-form natural language input being generated based on user interface input from a user at a client device;

in response to receiving the free-form natural language input:
  select, based on the free-form natural language input and from a corpus of content agents, a subset of the content agents, wherein the subset includes a first content agent and a second content agent that is disparate from the first content agent;

in response to selecting the subset of the content agents:
  transmit a corresponding request to each of the content agents of the subset, wherein in transmitting the corresponding request to each of the content agents one or more of the processors are to:
    transmit a first request to the first content agent, and
    transmit, to the second content agent, a second request that is disparate from the first request;
  receive, from each of the content agents of the subset in response to transmitting the corresponding requests, corresponding responsive content, including:
    first responsive content, from the first content agent, received in response to transmitting the first request, and
    second responsive content, from the second content agent, received in response to transmitting the second request;
  generate a composite response, wherein in generating the composite response one or more of the processors are to:
    apply two or more of the corresponding responsive contents to a trained generative model, that is a sequence-to-sequence model, to generate a resulting decoding that indicates the composite response, and
    determine, based on the resulting decoding, the composite response,
      wherein the two or more of the corresponding responsive contents, that are applied to the trained generative model in generating the composite response, include the first responsive content and the second responsive content, and
      wherein the composite response is shortened relative to the two or more responsive contents applied to the trained generative model; and
  cause the client device to render the composite response as responsive to the user interface input from the user.

12. The system of claim 11, wherein the second request has second content that is disparate from first content of the first request.

13. The system of claim 12, wherein the second request has a second format that is disparate from a first format of the first request.

14. The system of claim 11, wherein the two or more of the corresponding responsive contents, applied to the trained generative model in generating the composite response, is a subset of the corresponding responsive contents, and wherein one or more of the processors are further operable to execute the instructions to:
  select the subset of the corresponding responsive contents.

15. The system of claim 14, wherein in selecting the subset of the corresponding responsive contents one or more of the processors are to perform deduping, of the corresponding responsive contents, to remove one or more of the corresponding responsive contents from the subset.

16. The system of claim 14, wherein in selecting the subset of the corresponding responsive contents one or more of the processors are to:
  generate, for each of the corresponding responsive contents, a corresponding measure; and
  select the subset of the corresponding responsive contents using the corresponding measures.

17. The system of claim 16, wherein one or more of the processors are further operable to execute the instructions to:
  generate the corresponding measure, for the first responsive content, based on processing the first responsive content using a trained selection model.

18. The system of claim 11, wherein the two or more responsive contents are applied, on a token-by-token basis, to the trained generative model in generating the composite response.

19. The system of claim 11, wherein the one or more processors are remote from the client device but in communication with the client device via a wide area network, and wherein in causing the client device to render the composite response as responsive to the user interface input from the user one or more of the processors are to:
  provide the composite response via the wide area network;
  wherein the client device renders the composite response based on the composite response being provided via the wide area network.

* * * * *